(12) United States Patent
Wagstaff et al.

(10) Patent No.: US 10,057,395 B1
(45) Date of Patent: Aug. 21, 2018

(54) CASE FOR A MOBILE ELECTRONIC DEVICE

(71) Applicant: Carydean Enterprises LLC, Milford, NJ (US)

(72) Inventors: Dean Henry Wagstaff, Milford, NJ (US); Acel Ladd Wimmer, Washington, NJ (US)

(73) Assignee: CARYDEAN ENTERPRISES LLC, Milford, NJ (US)

( * ) Notice: Subject to any disclaimer, the term of this patent is extended or adjusted under 35 U.S.C. 154(b) by 0 days.

(21) Appl. No.: 15/687,487

(22) Filed: Aug. 27, 2017

(51) Int. Cl.
*H04B 1/00* (2006.01)
*H04M 1/02* (2006.01)
*H04M 1/725* (2006.01)
*H04B 1/3883* (2015.01)

(52) U.S. Cl.
CPC ........ *H04M 1/0274* (2013.01); *H04B 1/3883* (2013.01); *H04M 1/72527* (2013.01); *H04M 2201/36* (2013.01)

(58) Field of Classification Search
CPC .......... H04M 1/72527; H04M 2201/36; H04B 1/3883
See application file for complete search history.

(56) References Cited

U.S. PATENT DOCUMENTS

| | | | |
|---|---|---|---|
| 6,002,961 A | 12/1999 | Mitragotri et al. | |
| 7,163,511 B2 | 1/2007 | Conn et al. | |
| 8,029,443 B2 | 10/2011 | Goodnow | |
| 8,077,042 B2 | 12/2011 | Peeters | |
| 8,135,450 B2 | 3/2012 | Esenaliev et al. | |
| 8,229,535 B2 | 7/2012 | Mensinger et al. | |

(Continued)

FOREIGN PATENT DOCUMENTS

| | | |
|---|---|---|
| CN | 103245776 A | 8/2013 |
| CN | 204013674 U | 12/2014 |

(Continued)

OTHER PUBLICATIONS

Fox, "Daptr Brings the Headphone Jack to the iPhone 7", Hypebeast, Sep. 19, 2016, retrieved on Nov. 25, 2016 from https://hypebeast.com/2016/9/daptr-apple-iphone-7-case-headphone-jack, 14 Pages.

(Continued)

*Primary Examiner* — Ping Hsieh
(74) *Attorney, Agent, or Firm* — Maldjian Law Group LLC

(57) ABSTRACT

Some embodiments of the present invention are directed to a case for use with a mobile electronic device. The case includes a body that is detachably secured to the mobile electronic device. An electrical bus is disposed within the body. A connector is disposed on the body. The connector is communicably coupled to the mobile electronic device. The case further includes a memory configured to store a file received from the mobile electronic device through the connector, a processor configured to generate a signal based on the file stored in the memory, and an output port. The output port is configured to transmit the signal generated by the processor to an external device, wherein the external device is communicably coupled to the output port. The connector, the memory, the processor and the output port are communicably coupled to the electrical bus.

11 Claims, 21 Drawing Sheets

(56) References Cited

U.S. PATENT DOCUMENTS

| | | |
|---|---|---|
| 8,235,897 B2 | 8/2012 | Gal et al. |
| 8,268,243 B2 | 9/2012 | Drucker et al. |
| 8,531,824 B2 | 9/2013 | Rayner |
| 8,591,410 B2 | 11/2013 | Taub et al. |
| 8,597,570 B2 | 12/2013 | Terashima et al. |
| 8,684,922 B2 | 4/2014 | Tran |
| 8,737,971 B2 | 5/2014 | Van Rooyen et al. |
| 8,843,184 B2 | 9/2014 | Kim et al. |
| 8,870,766 B2 | 10/2014 | Stivoric et al. |
| 8,926,585 B2 | 1/2015 | Brauker et al. |
| 9,089,292 B2 | 7/2015 | Roy et al. |
| 9,125,549 B2 | 9/2015 | Weintraub et al. |
| 9,241,551 B2 | 1/2016 | Lawson et al. |
| 9,264,088 B2 | 2/2016 | Wojcik et al. |
| 9,332,334 B2 | 5/2016 | Chardon et al. |
| 9,374,788 B2 | 6/2016 | Singamsetti et al. |
| 9,398,127 B2 | 7/2016 | Ikemoto et al. |
| 9,406,913 B2 | 8/2016 | Huang et al. |
| 9,495,375 B2 | 11/2016 | Huang et al. |
| 9,632,056 B2 | 4/2017 | Iyengar et al. |
| 9,642,563 B2 | 5/2017 | Crawford et al. |
| 9,713,440 B2 | 7/2017 | Hurd et al. |
| 9,774,713 B2 | 9/2017 | Guerdrum et al. |
| 9,807,211 B2 | 10/2017 | Guerdrum et al. |
| 2005/0038377 A1 | 2/2005 | Redding, Jr. |
| 2008/0166791 A1 | 7/2008 | Kim et al. |
| 2009/0186264 A1* | 7/2009 | Huang ............... H01M 2/1022 429/96 |
| 2010/0000862 A1 | 1/2010 | Rao |
| 2010/0041156 A1 | 2/2010 | Brenneman et al. |
| 2010/0279418 A1 | 11/2010 | Larson et al. |
| 2010/0298764 A1 | 11/2010 | Yodfat et al. |
| 2011/0154889 A1 | 6/2011 | Stafford et al. |
| 2011/0163881 A1 | 7/2011 | Halff et al. |
| 2012/0059237 A1 | 3/2012 | Amir et al. |
| 2012/0063066 A1 | 3/2012 | Floit |
| 2012/0100601 A1 | 4/2012 | Simmons et al. |
| 2012/0149245 A1 | 6/2012 | Ralston et al. |
| 2012/0168336 A1 | 7/2012 | Schmidt et al. |
| 2012/0220220 A1* | 8/2012 | DeLuca ............ H04M 1/72527 455/41.1 |
| 2012/0330556 A1 | 12/2012 | Shaanan et al. |
| 2013/0053652 A1 | 2/2013 | Cooner |
| 2014/0005499 A1 | 1/2014 | Catt et al. |
| 2014/0018655 A1 | 1/2014 | Abulhaj et al. |
| 2014/0035511 A1 | 2/2014 | Ferber et al. |
| 2014/0072189 A1 | 3/2014 | Jena et al. |
| 2014/0168885 A1* | 6/2014 | Williams ............... G06F 1/1632 361/679.43 |
| 2014/0170761 A1 | 6/2014 | Crawford et al. |
| 2014/0321048 A1 | 10/2014 | Kupferstein |
| 2014/0326636 A1 | 11/2014 | Baschnagel |
| 2014/0364711 A1 | 12/2014 | Ismail et al. |
| 2015/0112170 A1 | 4/2015 | Amerson, III et al. |
| 2015/0246179 A1 | 9/2015 | Zur et al. |
| 2015/0381226 A1 | 12/2015 | Mogol |
| 2016/0072933 A1 | 3/2016 | Cox, III |
| 2016/0118861 A1 | 4/2016 | Gabriel et al. |
| 2016/0141910 A1 | 5/2016 | Klawon et al. |
| 2016/0148535 A1 | 5/2016 | Ashby |
| 2016/0308569 A1 | 10/2016 | Wei |
| 2016/0315652 A1 | 10/2016 | Tabatabai et al. |
| 2016/0331315 A1 | 11/2016 | Carter et al. |
| 2016/0361032 A1 | 12/2016 | Carter et al. |
| 2016/0367202 A1 | 12/2016 | Carter et al. |
| 2016/0374599 A1 | 12/2016 | Frattarola |
| 2017/0005683 A1* | 1/2017 | Yang ................... H04B 1/3888 |
| 2017/0095189 A1 | 4/2017 | Ralston et al. |
| 2017/0099377 A1* | 4/2017 | Moran ............ H04M 1/72527 |

FOREIGN PATENT DOCUMENTS

| | | |
|---|---|---|
| CN | 204389504 U | 6/2015 |
| WO | 2002005702 A2 | 1/2002 |
| WO | 2015138964 A1 | 9/2015 |
| WO | 2016055671 A1 | 4/2016 |
| WO | 2016080911 A1 | 5/2016 |
| WO | 2016169459 A1 | 10/2016 |

OTHER PUBLICATIONS

Otter Products, "PolarPro PowerPack _ OtterBox", retrieved on Nov. 25, 2016 from http://www.otterbox.com/en-us/polarpro/powerpack/plpr-powerpack.html, 3 Pages.

Gartenberg, "You Can Now Spend Money on the First iPhone 7 Headphone Jack Case", The Verge, Sep. 29, 2016, retrieved on Nov. 25, 2016 from https://www.theverge.com/circuitbreaker/2016/9/29/13105292/fuze-iphone-7-battery-pack-headphone-jack-case, 8 Pages.

Sandisk, "Ixpand Flash Drive", retrieved on Nov. 24, 2016 from https://www.sandisk.in/home/mobile-device-storage/ixpand, 9 Pages.

Apple Inc., "iPhone Lightning Dock", retrieved on Nov. 25, 2016 from https://www.apple.com/shop/product/MNN62AM/A/iphone-lightning-dock-black?afid=p231%7Ccamref%3A1100laKZ&cid=AOS-US-AFF-PHG, 3 Pages.

Yilmaz et al., "Detecting Vital Signs with Wearable Wireless Sensors", Sensors, vol. 10, No. 12, Dec. 2, 2010, retrieved on Nov. 30, 2017 from https://www.ncbi.nlm.nih.gov/pmc/articles/PMC3231103/pdf/sensors-10-10837.pdf, pp. 10837-10862.

Medhelp, "Sugar Sense—Diabetes App, Blood Sugar Control, and Carb Counter", Jun. 26, 2014, retrieved on Jul. 10, 2017 from https://itunes.apple.com/in/app/sugar-sense-diabetes-app-b100d/id880725347?mt=8, 4 Pages.

Pattnaik et al., "Alternate Glucometer Bio-sensor Model Based on Ultrasonic MEMS Transceivers", Proceedings of the 2013 COMSOL Conference, 2013, retrieved on Jul. 10, 2017 from https://www.comsol.com/paper/download/182793/pattnaik_paperpdf, 6 Pages.

Lee et al., "Wearable/Disposable Sweat-Based Glucose Monitoring Device with Multistage Transdermal Drug Delivery Module", Bioengineering, Science Advances, vol. 3, No. 3, Mar. 8, 2017, retrieved on Nov. 30, 2017 from http://advances.sciencemag.org/content/advances/3/3/e1601314.full.pdf, 8 Pages.

Mayo, "Report: Tim Cook Testing Wearable Blood Sugar Tracker on Apple's Campus, Connected to Apple Watch", May 18, 2017, retrieved on Jul. 10, 2017 from https://9to5mac.com/2017/05/18/report-tim-cook-testing-wearable-blood-sugar-tracker-on-apples-campus-connected-to-apple-watch/, 12 Pages.

Hoskins, "AkibaH and the GluCase: Building a Glucose Meter and Supplies into Your Smartphone Case", Diabetes Mine, Healthline, Sep. 28, 2015, 6 Pages.

Health, "iHealth Align", retrieved on May 11, 2016, 3 Pages.

Saenz, "Testing Your Blood Sugar with Your iPhone", SingularityHub, Sep. 22, 2010, retrieved on May 11, 2016 from https://singularityhub.com/2010/09/22/testing-your-blood-sugar-with-your-iphone/, 3 Pages.

* cited by examiner

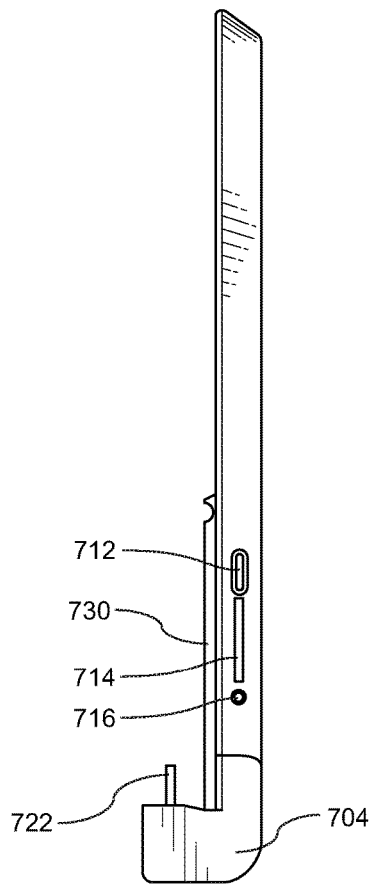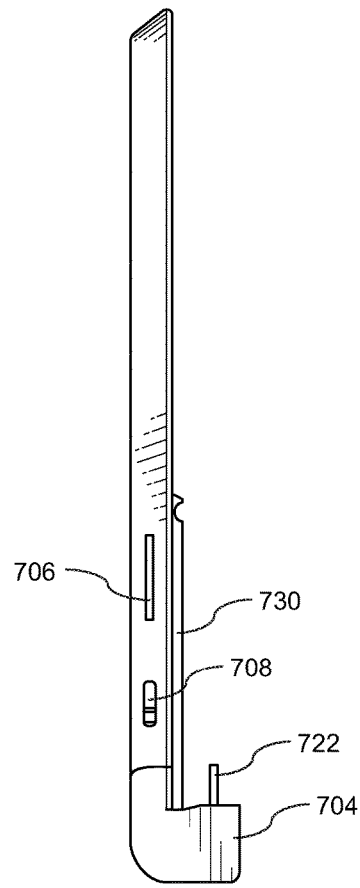
FIG. 7A  FIG. 7B
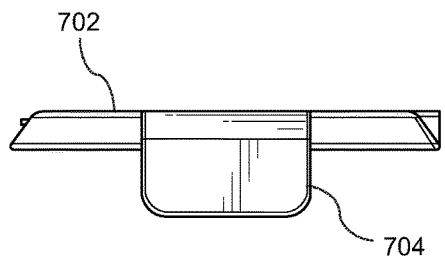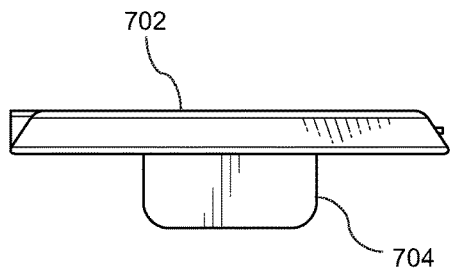
FIG. 7C  FIG. 7D

900

CASE FOR A MOBILE ELECTRONIC DEVICE

FIELD OF THE INVENTION

Embodiments of the present invention, generally relate to a case for receiving and holding mobile electronic devices. In particular, embodiments are directed to a case having one or more ports.

BACKGROUND

Mobile electronic devices, such as cell phones and tablets serve countless functions. Mobile electronic devices are used as communication devices, music players, video game consoles and computing devices. However, there are limitations to their potential functionality. For example, mobile electronic devices often include substandard speakers, as device makers are forced to sacrifice audio quality due to space constraints, technical constraints and pricing concerns. Manufacturers are also often forced to compromise on battery capacity and storage capacity. This leaves users with two choices, either locate charging stations, or avoid using the mobile electronic device to conserve power.

In many instances, a user may not be able to customize the storage capacities of purchased mobile electronic devices. For example, certain mobile electronic devices do not have additional slots for external memory cards or memory units, to expand the storage capacity. A purchase of a newer mobile electronic device with a larger storage capacity may not be a value proposition for the user, since mobile electronic device manufacturers often charge a premium for the additional memory.

In many instances, memory units are embedded in the mobile device thereby making them irremovable. Such memory units cannot be transferred to newer mobile devices, thereby further reducing customization options for users. While alternative solutions addressing the limited storage capacities, such as the usage of cloud storage, are available, these are subject to availability of the Internet, privacy concerns, and accessibility issues.

Further, data migration from an existing mobile electronic device to another device may also be difficult due to network effects, compatibility issues and irremovable memories.

Mobile electronic devices are often provided with cases or attachments, which include additional battery packs or power sources. However, such cases do not include memory units that provide additional storage capacities for the mobile devices placed in the cases.

SUMMARY

Embodiments, in accordance with the present disclosure, are directed to a case that is detachably fixed to a mobile electronic device, such as a cell phone. The case may include a battery pack, an extended storage capacity and an output port that is communicably coupled to an external device, such as wired headphones or a display monitor. The case may be communicably attached to the mobile electronic device through a power/data connector port. Additionally, the case may include a memory unit, which acts as a bridge to write data from the device to the extended storage capacity. In yet another embodiment of the present invention, the case may include an additional storage slot for storing additional SD card(s).

In accordance with another aspect of the present disclosure, the case may be designed as a protective case to be directly attached to a cell phone or as an apparatus to be attached to a mobile electronic device case such as the Otterbox® Universal Case and/or an Otterbox® Universal Case having a mobile electronic device contained therein. The case allows the user to extend the battery capacity and memory storage capacity of the mobile electronic device. The terms case and apparatus are synonymous and may be used interchangeably.

Embodiments, in accordance with the present invention, are directed to a case having a body configured to receive an Otterbox® Universal Case and/or an Otterbox® Universal Case having a mobile electronic device contained therein. In other embodiments of the present invention, the case further includes a rail disposed on the body to allow the case to be attached to the Otterbox® Universal Case.

In other embodiments of the present invention, the case is of a shell design but may also be in the form of a pouch, sleeve, holster, wallet or similar design. The case may also include a connector disposed on the body. The case further includes a memory card slot. The case also includes an output port. The output port is operably connected to the connector through an electrical bus. The case further includes a Universal Serial Bus (USB) connector. The case also includes a flash memory provided within the body. Further, the flash memory is operably coupled to the connector and the memory card slot. The case further includes a battery provided within the body. In yet another embodiment of the present invention, the case may include an additional storage slot for storing additional SD cards.

Some embodiments of the present invention are directed to a case for use with a mobile electronic device. The case includes a body that is detachably secured to the mobile electronic device. An electrical bus is disposed within the body. A connector is disposed on the body. The connector is communicably coupled to the mobile electronic device. The case further includes a memory configured to store a file received from the mobile electronic device through the connector, a processor configured to generate a signal based on the file stored in the memory and an output port. The output port is configured to transmit the signal generated by the processor to an external device, wherein the external device is communicably coupled to the output port. The connector, the memory, the processor and the output port are communicably coupled to the electrical bus.

Some other embodiments of the present invention are directed to a system for use with an Otterbox® Universal Case and/or an Otterbox® Universal Case having a mobile electronic device housed therein, wherein the system comprises an apparatus having a body configured to receive an Otterbox® Universal Case both with and without a mobile electronic device. The Otterbox® Universal Case may be detachably secured to the apparatus through a rail. The apparatus further includes a body, an electrical bus disposed within the body and a connector. The connector is communicably coupled to the mobile electronic device contained within the Otterbox® Universal Case. The apparatus further includes a memory configured to store a file received from the mobile electronic device through the connector, a processor configured to generate a signal based on the file stored in the memory and an output port. The output port is configured to transmit the signal generated by the processor to an external device. The connector, the memory, the processor and the output port are communicably coupled to the electrical bus. The case may include an additional storage slot for storing additional SD cards.

Yet other embodiments of the present invention are directed to a system including an apparatus configured to receive an Otterbox® Universal Case housing a mobile electronic device therein. The apparatus includes a rail with the Otterbox® Universal Case being secured to the apparatus through the rail. The apparatus further includes a body, an electrical bus disposed within the body, and a connector that is communicably coupled to the mobile electronic device. The apparatus further includes a memory configured to store a file received from the mobile electronic device through the connector and a memory device holder. The memory device holder detachably receives a memory storage device. The apparatus further includes a processor configured to generate a signal based on the file stored in the memory and an output port. The output port is configured to transmit the signal generated by the processor to an external device, wherein the external device is communicably coupled to the electrical bus. The connector, the memory, the memory device holder, the processor and the output port are communicably coupled to the electrical bus. In another embodiment of the present invention, the case may include an additional storage slot for storing additional SD cards.

These and other advantages will be apparent from the present application of the embodiments described herein.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The accompanying drawings, which are incorporated in and constitute a part of this specification, illustrate several embodiments of the disclosure and, together with the description, explain the principles of the disclosure.

FIG. 7A illustrates a right-side view of the apparatus, in accordance with an embodiment of the present invention;

FIG. 7B illustrates a left-side view of the apparatus, in accordance with an embodiment of the present invention;

FIG. 7C illustrates a bottom view of the apparatus, in accordance with an embodiment of the present invention;

FIG. 7D illustrates a top view of the apparatus, in accordance with an embodiment of the present invention;

Figure 1A:
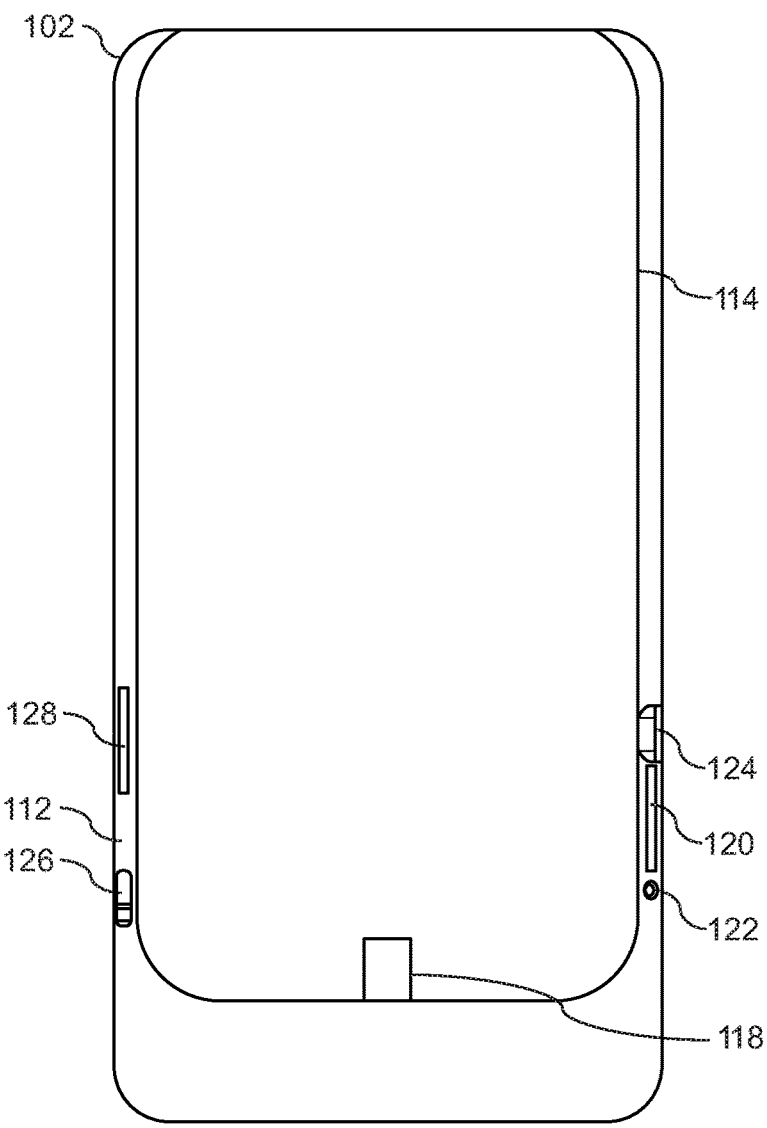
FIG. 1A illustrates a front view of a case, in accordance with an embodiment of the present invention.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The present invention is directed to a case for use with a mobile electronic device. The case includes a body that is detachably secured to the mobile electronic device. An electrical bus is disposed within the body. A connector is disposed on the body. The connector is communicably coupled to the mobile electronic device. The case further includes a memory configured to store a file received from the mobile electronic device through the connector, a processor configured to generate a signal based on the file stored in the memory, and an output port. The output port is configured to transmit the signal generated by the processor to an external device, wherein the external device is communicably coupled to the output port. The connector, the memory, the processor and the output port are communicably coupled to the electrical bus. In another embodiment of the present invention, the case may include an additional storage slot for storing additional SD cards.

Figure 1B:
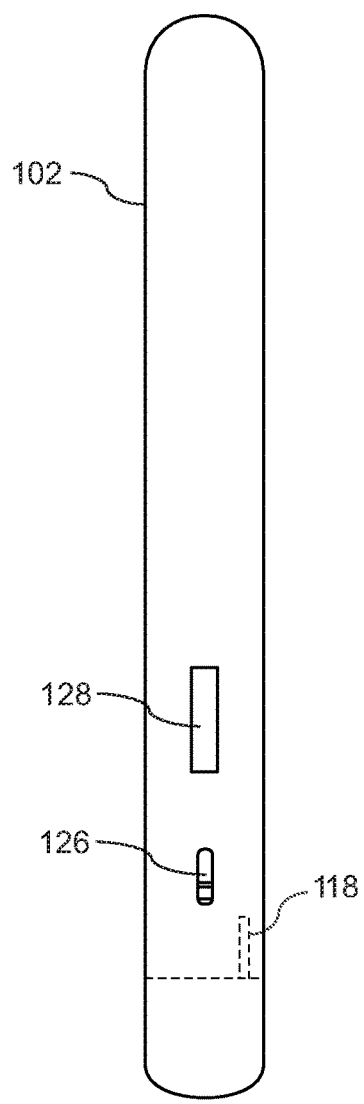
FIG. 1B illustrates a left-side view of the case, in accordance with an embodiment of the present invention.
Figure 1C:
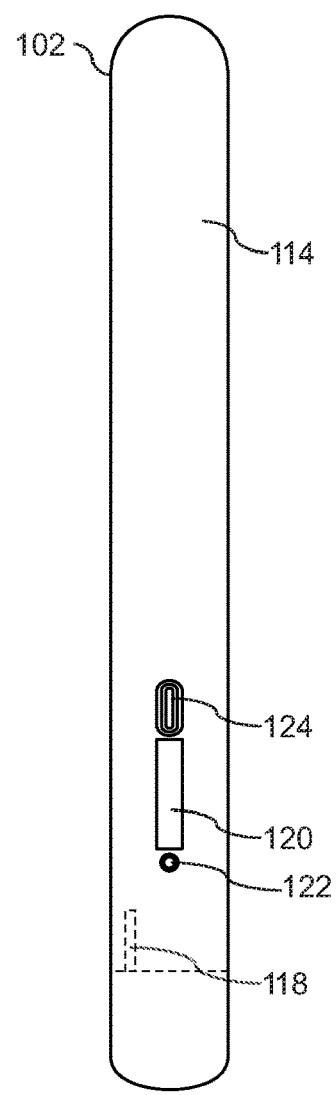
FIG. 1C illustrates a right-side view of the case, in accordance with an embodiment of the present invention.

FIG. 1A illustrates a front view of a case 100, in accordance with an embodiment of the present disclosure. FIG. 1B illustrates a left-side view of the case 100. FIG. 1C illustrates a right-side view of the case 100. Referring to FIGS. 1A, 1B and 1C, the case 100 includes a body 102. The body 102 physically attaches the case 100 to a mobile electronic device (not shown in FIG. 1). Though, the body 102 is illustrated as having a substantially planar shape, it may comprise alternative shapes to allow for the body 102 to be secured to a mobile electronic device. For example, the body 102 may have a concave shape.

The mobile electronic device, in accordance with embodiments of the present invention, may be, but not limited to, a cell phone, a smart phone, a tablet computer, a digital music player, a personal digital assistant and the like. In an embodiment of the present invention, the case 100 is designed to accept a mobile electronic device. The mobile electronic device may be pushed or slid into the case 100. Upon receipt of the mobile electronic device in the case 100, the connector 118 may be inserted into an input port of the mobile electronic device. In an alternative embodiment of the present invention, the mobile electronic device is first attached to the connector 118 and inserted into the case 100. The body 102 has at least one curved edge. FIG. 1A illustrates an embodiment of the present invention wherein the body comprises curved edges 112 and 114. The curved edges 112 and 114 of the case 100 may overlap the outside edge of the mobile electronic device. In yet another embodiment of the present invention, the curved edge of the case 100, may surround all side edges of the mobile electronic device The body 102 may be manufactured from materials such as, but not limited to, plastic, polyurethane, polycarbonate, carbon fiber, leather, silicon and so forth. In some embodiments, the body 102 may include a pair of flanges (not shown), extending from the sides of the body 102, to support the mobile electronic device.

The case 100 further includes a connector 118 disposed on the body 102. The connector 118 provides a charging interface to the mobile electronic device. In some embodiments, the connector 118 provides a data transfer interface. In yet other embodiments, the connector 118 provides a combination of a data transfer interface and a charging interface. Examples of the connector 118 may include any connector, such as, but not limited to, a lighting connector, a micro-USB (Universal Serial Bus) connector, a USB type-C (Universal Serial Bus Type-C) connector and the like. The connector 118 may establish a connection between the case 100 and the mobile electronic device. The connection may enable power and data links between the case 100 and the mobile electronic device. In some embodiments, the mobile electronic device may be secured to the case 100 via the connector 118.

A memory card slot 120 is provided on the body 102 (as shown in FIGS. 1A and 1C). The memory card slot 120 receives a memory storage device (not shown). In some embodiments, the memory storage device may act as an extended storage capacity device for the mobile electronic device. Example of the memory storage slot 120 may include a Secure Digital (SD) card slot, a mini SD card slot, a micro SD card slot, a Multi Media Card (MMC) slot and so forth. In another embodiment of the present invention, the case may include an additional storage slot 128 for storing one or more SD cards.

In some embodiments, the case 100 includes a flash memory (not shown). Data from the mobile electronic device may be received via the connector 118 and stored in the flash memory. The flash memory may include a non-volatile computer storage medium that can be electrically erased and programmed. Further, the flash memory may store the data received from the mobile electronic device in the memory storage device held in the memory card slot 120. The memory storage device is communicably coupled to the flash memory through the memory card slot 120. The memory card slot 120 may act as an interface between the memory storage device and the flash memory.

The case 100 further includes an electrical bus (not shown). The electrical bus is a communication mechanism, used to exchange information and/or signals between the internal components of the case 100. The bus includes one or more parallel conductors of information so that information is transferred quickly among devices coupled to the bus. The connector 118, the memory card slot 120, and the flash memory are communicably coupled to the electrical bus. The flash memory receives data from the mobile electronic device or transmits data to the mobile electronic device through the connector 118 and the electrical bus. Data is transferred between the memory card slot 120 and the flash memory through the electrical bus.

In some embodiments, the case 100 includes a processor (not shown) that executes instructions pertaining to receiving data from the mobile electronic device through the connector 118. The processor includes circuitry that carries out the instructions of a computer program by performing input/output operations, logical operations and arithmetic operations pertaining to the instructions. In some embodiments, the processor may be a microcontroller embedded in a printed circuit board. In other embodiments, the processor may be a multipurpose, clock driven, register based, digitalintegrated circuit coupled to a memory. The processor is communicably coupled to the connector 118, the memory card slot 120 and the flash memory through the electrical bus. The processor generates a user interface displayed through an application deployed on the mobile electronic device. The processor is further configured to generate indicia indicative of data stored in the storage device and the flash memory. The processor transmits the generated indicia to the mobile electronic device through the electrical bus and the connector 118. Through the application on the mobile electronic device, data stored in the flash memory and/or the storage device may be accessible to a user. In some embodiments, the processor may be configured to install the application on the mobile electronic device through the electrical bus and the connector 118, when the mobile electronic device is communicably coupled to the connector 118 for the first time. In other embodiments, the application may be downloaded from the Internet and installed on the mobile electronic device. In some embodiments, the application may be configured to receive input for various actions, such as, but not limited to, transferring files between the flash memory and the memory storage device, deleting a file from the memory storage device, transferring files between the memory storage device and the mobile electronic device, storing files received from the Internet on the memory storage device and the like.

For example, the application may receive an input pertaining to storing files on the memory storage device. The input may be a command that is transmitted to the processor through the connector 118 and the electrical bus. The file to be stored is further transmitted to the flash memory through the connector 118 and the electrical bus. The processor is configured to transfer the file from the flash memory to the memory storage device through the electrical bus and the memory card slot 120. In some embodiments, the application may provide options for accessing media files stored on the memory storage device. A media file may be, but not limited to, audio files, motion picture files, still picture files and the like. The media files are transferred to the flash memory from the mobile electronic device through the connector 118 and the electrical bus. Further, the media files may be permanently stored on the storage device. In some embodiments, the media file may be compressed or decompressed using coder-decoder programs optimized for use with the processor.

An output port 122 may be disposed on the body 102 (as shown in FIG. 1A and FIG. 1C). The output port 122 allows the user to connect an external device (not shown) to the mobile electronic device. The external device may include devices such as, but not limited to, headphones, earphones, speakers, television sets, personal computers, display monitors, portable media players, and so forth. In some embodiments, the output port 122 establishes a bi-directional signal link between a wired external device (not shown) and the mobile electronic device. In some embodiments, the output port 122 may be an audio port with an internal diameter of approximately 3.55 millimeter. The output port 122 may have any suitable dimensions for the transmission of an audio signal between the mobile electronic device and the external device.

In some embodiments, the output port 122 may be a video port. The video port may be, but not limited to, a High-Definition Multimedia Interface (HDMI) port, a serial output port, a video graphics array (VGA) port, a digital visual interface (DVI) port, and the like. In some embodiments, the output port 122 may be a combination of an audio port and a video port. In other embodiments, the case 100 may include two output ports, one being an audio port and the other being a video port.

The output port 122 may receive a signal that is converted from a media file stored on the flash memory or the storage device using signal processing circuitry (not shown). In some embodiments, the signal processing circuitry includes a digital to analog converter. For example, a Moving Picture Experts Group Layer-3 (MP3) file may be transferred to the flash memory through the connector 118 and the electrical bus from the mobile electronic device. The processor converts the MP3 file to an audio signal using the signal processing circuitry. The audio signal is transmitted to the output port 122.

In another example, a user may opt to play a media file stored on the mobile electronic device using the application. A user interface generated by the processor disposed in the case 100 is displayed through the application. The application may display multiple media files stored on the memory storage device. Such indicia are generated by the processor based on the files stored on the memory storage device. In some embodiments, the application may also display media files stored on the mobile electronic device. The application may enable the user to select a media file from the multiple media files to be played. Upon selection, based on the location of the media file, the media file is transferred from the memory storage device to the flash memory or from the mobile electronic device to the flash memory through the electrical bus. The audio frames and the moving picture frames of the video file are converted to analog signals by the signal processing circuitry and transmitted to the output port 122. The analog signals are consequently transmitted to the external device (not shown) connected to the output port 122.

In some embodiments, the media file may be transmitted to the output port directly without conversion to an analog signal.

Further, a universal serial bus (USB) connector 124 is disposed on the body 102 (as shown in FIG. 1A and FIG. 1C). The USB connector 124 is separate from the output port 122 and is communicably coupled to the electrical bus. The USB connector 124 establishes a connection between the case 100 and an external energy source (not shown). The external energy source can be any energy source such as, but not limited to, a power pack, a mobile phone charger, an uninterrupted power supply, household power sources and the like. In some other embodiments, the USB connector 124 establishes a data connection between the case 100 and an electronic device, such as, but not limited to, a personal computer, a mobile phone, a laptop, a tablet and so forth. The data connection between the case 100 and the electronic device allows transmission of data between the mobile electronic device and the electronic device. The data may include information such as, but not limited to, audio information, graphical information, text information and so forth.

FIG. 1A and FIG. 1C also illustrate a power button 126 disposed on the body 102. The power button may be in any shape or size including but not limited to a round or square button used to power the case 100 on and off. In an embodiment of the present invention, the case 100 powers on when the power button 126 is pressed and powers off when the power button 126 is pressed again. In yet another embodiment of the present invention, the power button 126 may take the form of a switch or any like means serving to change the on/off status of the case 100. While the case 100 in FIG. 1A-FIG. 3 represent one configuration, in other embodiments of the present invention, the USB port 124, memory device holder 120, output port 122, power switch 126 and secondary storage slot 128 may be placed in any configuration and location on the case 100.

Figure 2:
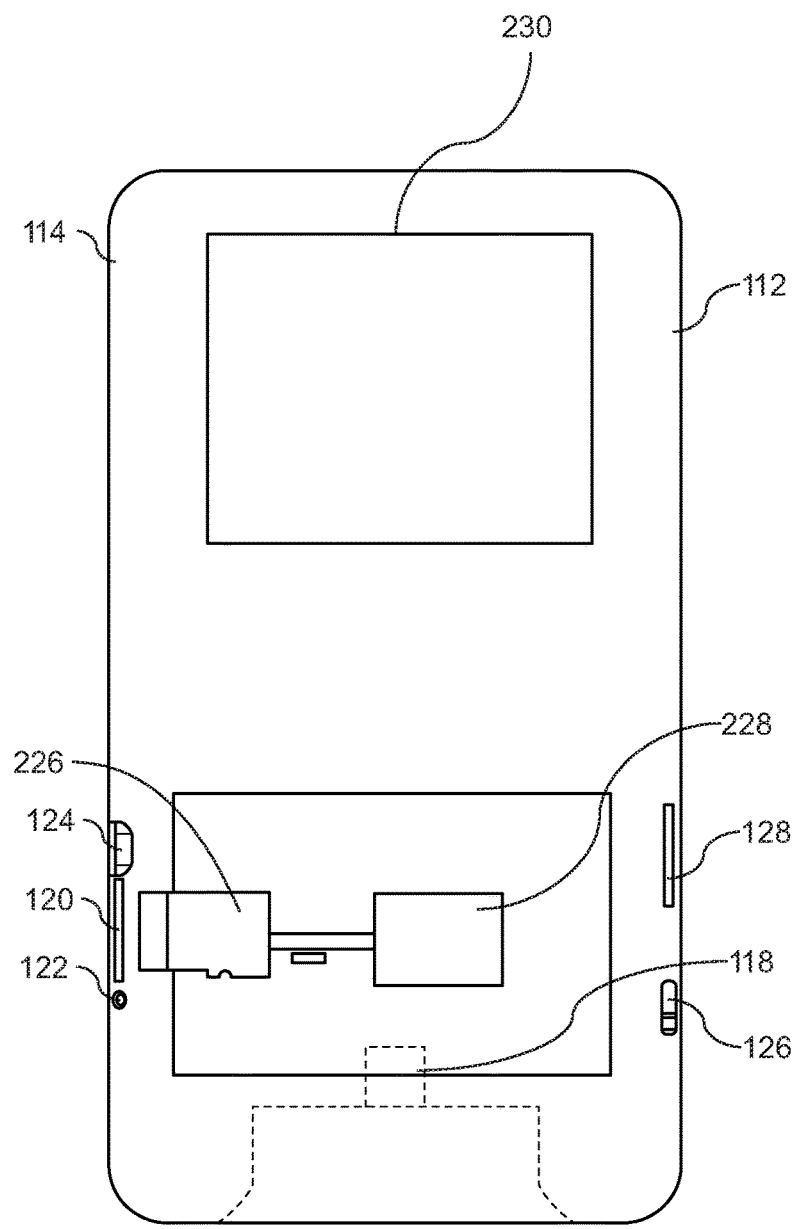
FIG. 2 illustrates a rear view of the case, in accordance with an embodiment of the present invention.

FIG. 2 illustrates a rear view of the case 100 illustrating internal components of the case 100. Further, to facilitate understanding, parts illustrated in FIGS. 1A, 1B and 1C are provided with the same referral numerals. The case 100 includes a flash memory 228. As illustrated in FIG. 2, a memory storage device 226 is received within the memory card slot 120. The memory storage device 226 can include a Secure Digital (SD) card, a mini SD card, a micro SD card, a Multi Media Card (MMC) and so forth. In some embodiments, the memory storage device 226 may be accessible to the mobile electronic device coupled to the case 100. For example, data is transferred to and from the mobile electronic device to the memory storage device 226 via the connector 118.

The case 100 also includes a flash memory 228 that establishes a data connection link between the memory storage device 226 and the mobile electronic device through an electrical bus disposed within the body 102. The flash memory 228 may include an electronic (solid-state) non-volatile computer storage medium that can be electrically erased and reprogrammed.

A battery 230 is also disposed within the body 102 of the case 100. The battery 230 charges an internal battery of the mobile electronic device through the connector 118 and the electrical bus. The battery 230 provides power backup to the mobile electronic device, in case the internal battery of the mobile electronic device is depleted or on the verge of being depleted. Alternatively, the battery 230 may charge the mobile electronic device in case the internal battery of the mobile electronic device requires charging. The battery 230 can include any battery type such as, but not limited to, a lithium polymer battery, a lithium ion battery, a nickel metal hybrid battery, a nickel cadmium battery and so forth. In some other embodiments, the battery 230 may act also as a power source for various internal components of the case 100.

Figure 3:
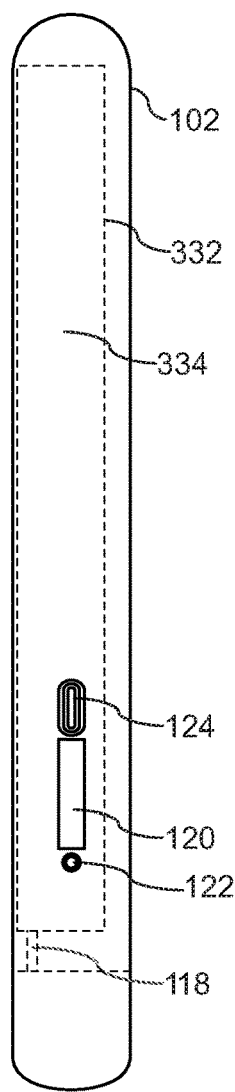
FIG. 3 illustrates a right-side view of the case with a mobile electronic device received in the case.

FIG. 3 illustrates a right-side view of the case 100 coupled to a mobile electronic device 332. The mobile electronic device 332 may be pushed or slid into the case 100. Upon receipt of the mobile electronic device 332 in the case 100, the connector 118 is inserted into an input port of the mobile electronic device 332. The edges 112 and 114 (shown in FIG. 1A) of the case 100 overlap outer edges 334 (one shown in FIG. 3) of the mobile electronic device 332. The mobile electronic device 332 may include any communication device such as, but not limited to, smartphones. The mobile electronic device 332 is communicably coupled to the case 100 via the connector 118 (as shown in FIG. 3). In some embodiments, the shape and size of the case 100 may be designed in accordance with shape and size of the mobile electronic device 332. FIG. 3 further illustrates other embodiments of the present invention, namely a memory card slot 120, an output port 122 and a USB connector 124.

Figure 4:
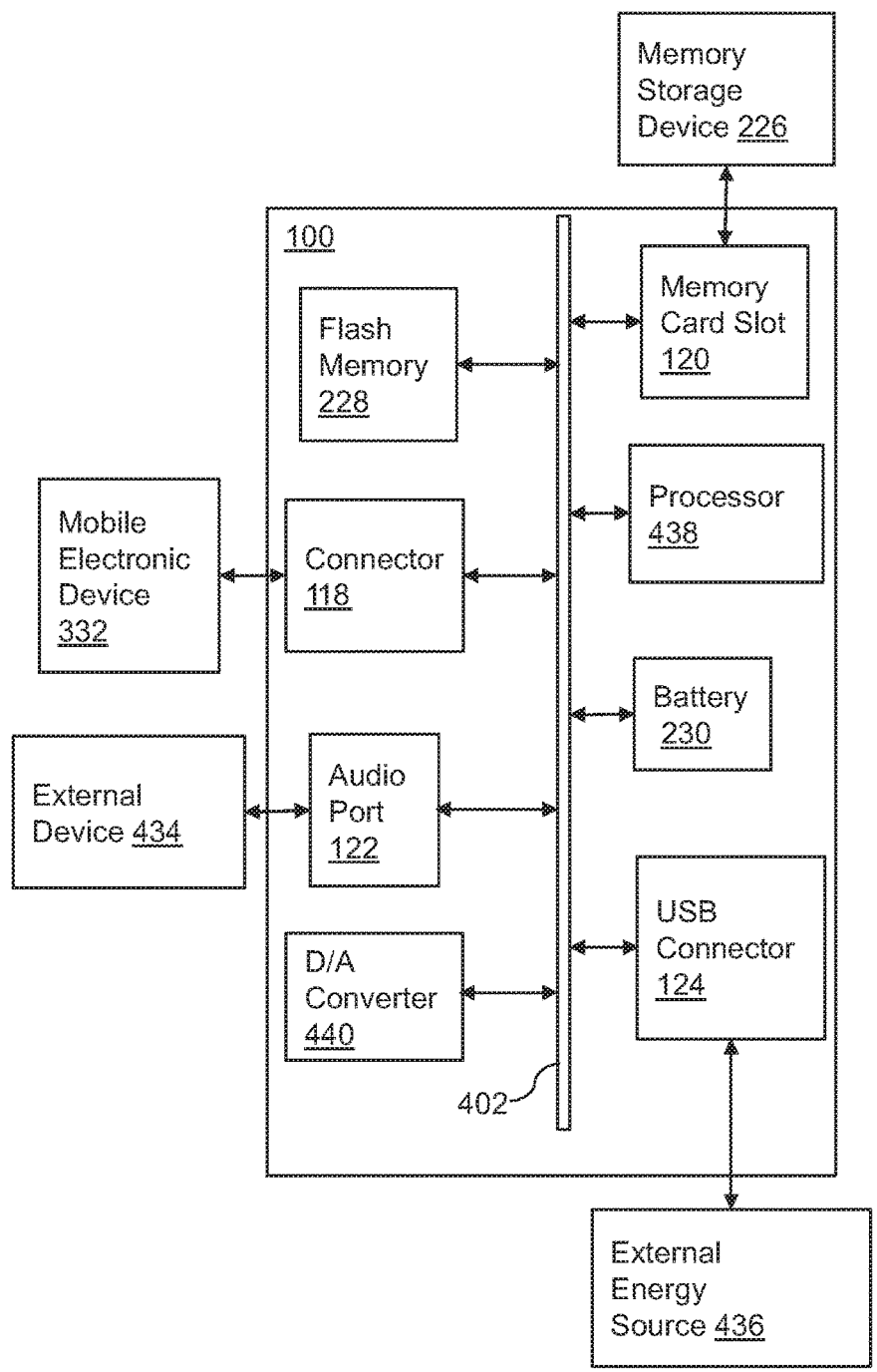
FIG. 4 illustrates a block diagram of the case, in accordance with an embodiment of the present invention.

FIG. 4 illustrates a system 400, in accordance with an embodiment of the present disclosure. Further, to facilitate understanding, parts illustrated in FIGS. 1A to 3 are provided with the same referral numerals in FIG. 4. As illustrated in FIG. 4, the case 100 is communicably coupled to a mobile electronic device 332 via the connector 118. The connector 118 provides a charging interface between the mobile electronic device 332 and the case 100. In some embodiments, the connector 118 provides a data transfer interface between the mobile electronic device 332 and the case 100. In yet other embodiments, the connector 118 provides a combination of a data transfer interface and a charging interface.

The case 100 includes a communication mechanism, such as an electrical bus 402 (hereinafter "the bus 402"). The bus 402 is used to exchange information and/or signals between the internal components of the case 100. The bus 402 includes one or more parallel conductors of information so that information is transferred quickly among devices coupled to the bus 402. The flash memory 228, the connector 118, the memory card slot 120, a processor 438, the battery 230, the output port 122, a digital-to-analog converter 440 and the USB connector 124 are communicably coupled to the bus 402. The flash memory receives data from the mobile electronic device 332 or transmits data to the mobile electronic device 332 through the connector 118. The flash memory 228 may include a non-volatile computer storage medium that can be electrically erased and reprogrammed. Further, the flash memory 228 may store the data received from the mobile electronic device 332 onto the memory storage device 226. The memory storage device 226 is communicably coupled to the flash memory 228 through the memory card slot 120 and the bus 402. The memory card slot 120 may act as an interface between the memory storage device 226 and the flash memory 228. Examples of the memory card slot may include a Secure Digital (SD) card slot, a mini SD card slot, a micro SD card slot, a Multi Media Card (MMC) slot and so forth. Further, the case 100 may transmit the data from the memory storage device 226 through the flash memory 228. In some embodiments, the case 100 may directly transmit data to the mobile electronic device 332 from the flash memory 228. The data may include information such as, but not limited to, audio information, graphical information, text information and so forth.

The output port 122 is communicably coupled to the connector 118 through the bus 402. In some embodiments, the output port 122 may be at least one of an audio port, a video port or a combination of both. The output port 122 allows the user to connect an external device 434 to the mobile electronic device. The external device 434 may include any wired media transmitting device such as, but not limited to, headphones, speakers, a television set, a portable video player and so forth. In some embodiments, the output port 122 establishes a signal link between the external device 434 and the mobile electronic device 332. The output port 122 along with the bus 402 may act as an interface between the external device 434 and the mobile electronic device 332 for the transmission of a signal between the external device 434 and the mobile electronic device 332. The signal may be transmitted from the mobile electronic device 332 to the external device 434 through the connector 118.

The battery 230 charges an internal battery (not shown) of the mobile electronic device 332. The battery 230 is electrically coupled to the connector 118 through the bus 402. The battery 230 supplies electric charge to the mobile electronic device 332 through the connector 118. The battery 230 provides power backup to the mobile electronic device 332, in case the internal battery of the mobile electronic device requires charging. The battery 230 can include any battery type such as, but not limited to, a lithium polymer battery, a lithium ion battery, a nickel metal hybrid battery, a nickel cadmium battery and so forth. In some other embodiments, the battery 230 may be connected to the internal components of the case 100 to supply energy, required for the functioning of the internal components.

The USB connector 124 establishes a connection between the battery 230 and an external energy source 436 through the bus 402. The external energy source 436 can be any energy source such as, but not limited to, a power pack, a mobile phone charger, an uninterrupted power supply, household power sources and the like. In some other embodiments, the USB connector 124 establishes a data connection between the case 100 and an electronic device (not shown), such as, but not limited to, a personal computer, a mobile phone, a laptop, a tablet and so forth. The data connection between the case 100 and the electronic device allows transmission of data between the mobile electronic device and the electronic device. The data may include information such as, but not limited to, audio information, graphical information, text information and so forth. In some other embodiments, the mobile electronic device 332 may directly transmit or receive data to and from the electronic device through the USB connector 124.

In some embodiments, the USB connector 124 may be directly connected to the connector 118, thereby establishing a connection between the mobile electronic device 332 and the external energy source 436. The direct connection between the mobile electronic device 332 and the external energy source 436 may allow direct transmission of energy from the external energy source 436 to the internal battery of the mobile electronic device 332.

Various features associated with the internal components of the case 100 may be implemented through a processor 438. The processor 438 may regulate the transmission of various data (for example, data signals, video signals, audio signals, and the like) as described above. In some embodiments, the processor 438 may regulate the flow of input energy to prevent the battery 230 for any kind of damage due to voltage fluctuations. Further, the processor 438 may also regulate the flow of output energy to prevent the battery 230 from being under charged or a battery of the mobile electronic device from being overcharged. The processor 438 may be coupled to appropriate control circuitry, such as a bus or other communication mechanism (not shown) for communicating information.

In some embodiments, the processor 438 determines a state of charge of a battery of the mobile electronic device 332, when the mobile electronic device 332 is communicably coupled to the connector 118. The processor 438 controls the charging of the battery of the mobile electronic device 332 by the battery 230 based on the determined state of charge. For example, the processor 438 may determine a state of charge of the battery. If the state of charge is less than a threshold, the processor 438 may initiate charging of the battery of the mobile electronic device 332 by the battery 230. If the state of charge reaches a maximum limit, the charging is stopped.

In some embodiments, when the mobile electronic device is coupled to the connector 118, the processor 438 generates a user interface that is displayed through an application on the mobile electronic device. The application may be obtained from the Internet or may be installed by the processor 438 on the mobile electronic device 332 upon coupling the mobile electronic device to the connector 118. The user interface displays indicia indicative of data stored in the memory storage device 226 and/or the flash memory 228. For example, the user interface may display all the files stored on the memory storage device 226. Additionally, the user interface enables a user to transfer any data on the mobile electronic device 332 to the memory storage device 226.

In some embodiments, the application may provide a media player that accesses media files stored on the mobile electronic device 332. Upon accessing a media file through the application, the processor 438 transfers the media file to the flash memory 228 through the connector 118. The media player within the application plays the media file from the flash memory 228. The application further enables a user to direct the processor 438 to transfer the media file to the memory storage device. Audio and video frames pertaining to the media file are sampled and converted to an analog signal by a digital-to-analog converter 440 (D/A converter 440). The analog signal is transmitted to the output port 122. The audio signal is further transmitted to the external device 434. In some embodiments, the processor 438 may determine if the external device 434 is connected to the output port 122 and play the media file from the flash memory 228 or the memory storage device 226 only if the external device 434 is connected to the output port 122.

In some embodiments, the media file may be transferred to the memory storage device 226 through the memory card slot 120 based on a user's input through the user interface generated by the processor 438. If the user provides an input indicative of playing the transferred media file, audio and video frames pertaining to the media file are sampled and converted to an analog signal by the D/A converter 440. The analog signal is transmitted to the output port 122. The audio signal is further transmitted to the external device 434.

Figure 5A:
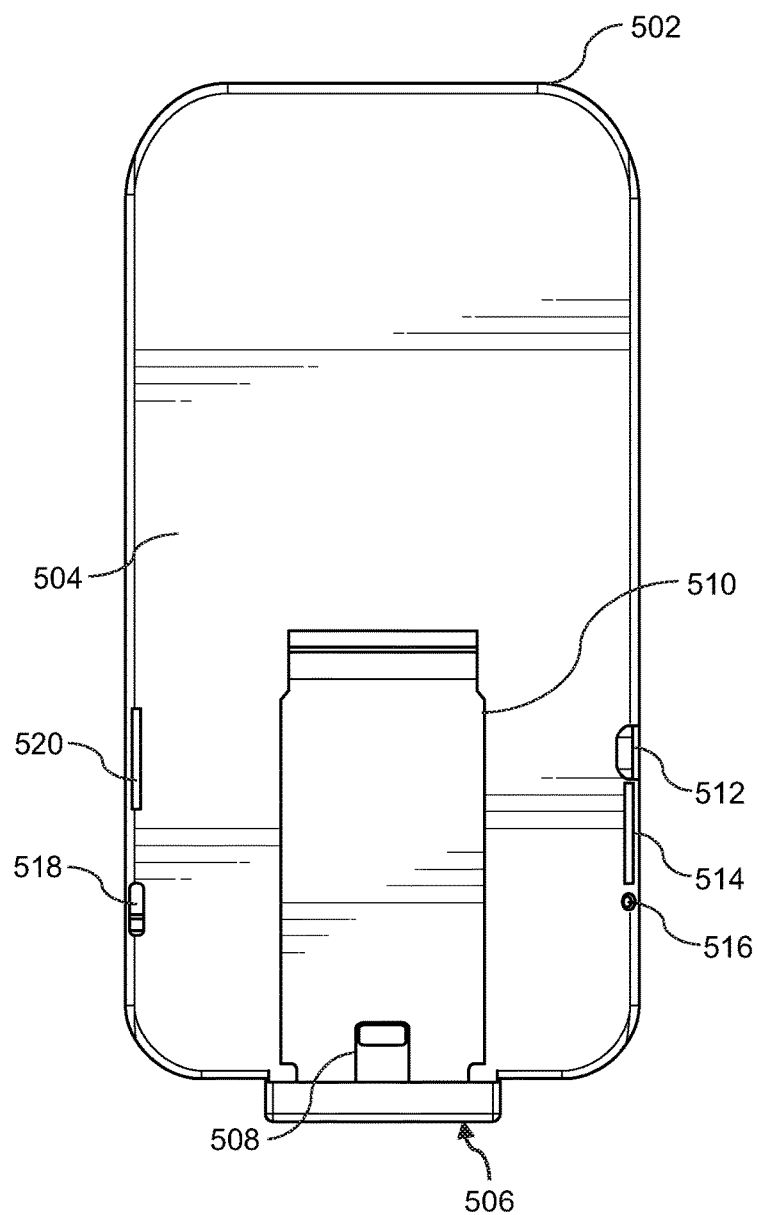
FIG. 5A illustrates a front view of an apparatus, in accordance with an embodiment of the present invention.

FIGS. 5A, 5B, 5C and 5D illustrate various views of an apparatus 500. In particular, FIGS. 5A, 5B, 5C and 5D illustrates a front view, a rear view, a left side view and a bottom view of the apparatus 500, respectively. The apparatus 500 is similar to the case 100 except for some physical design features, such as the second portion 506 and a rail 510. The apparatus 500 also includes a power switch 518 and a secondary storage slot 520 for additional storage cards including but not limited to SD cards. FIG. 5A illustrates a front view of the apparatus 500, according to an embodiment of the present invention. The apparatus 500 may be detachably attached to an Otterbox® Universal Case (not shown). In other embodiments of the present invention the apparatus 500 may be detachably attached to an Otterbox® Universal Case housing a mobile electronic device (not shown). The apparatus 500 includes a body 502. The body 502 includes a first portion 504 and a second portion 506 extending from the first portion 504. The first portion 504 includes a rail 510. In some embodiments, an Otterbox® Universal Case housing a mobile electronic device may be detachably attached to the apparatus 500 through the rail 510.

A connector 508 is disposed on the second portion 506. An Otterbox® Universal Case housing a mobile electronic device may be secured to the apparatus 500 through the rail 510, the connector 508 being communicably coupled to an input port of the mobile electronic device. The connector 508 provides a charging interface to the mobile electronic device. The electrical bus is disposed within the first portion 504 (not shown). The electrical bus is communicably coupled with all the internal components of the apparatus 500, including the connector 508. In some embodiments, the connector 508 provides a data transfer interface. In yet other embodiments, the connector 508 provides a combination of a data transfer interface and a charging interface. Examples of the connector 508 may include any connector, such as, but not limited to, a lighting connector, a micro-USB (Universal Serial Bus) connector, a USB type-C (Universal Serial Bus Type-C) connector and the like. The connector 508 may establish a connection between the Otterbox® Universal Case 500 and a mobile electronic device contained therein. The connection may enable power and data links between the apparatus 500 and the mobile electronic device. [0083].

Figure 5B:
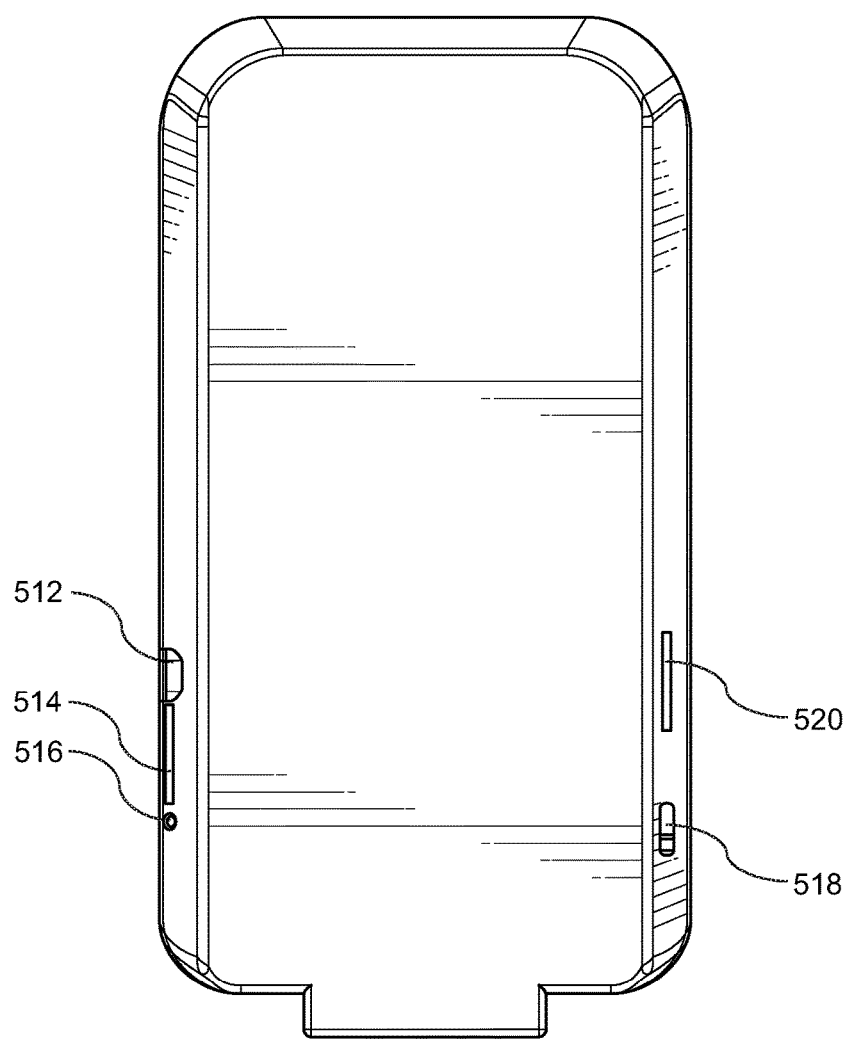
FIG. 5B illustrates a rear view of an apparatus, in accordance with an embodiment of the present invention.
Figure 5C:
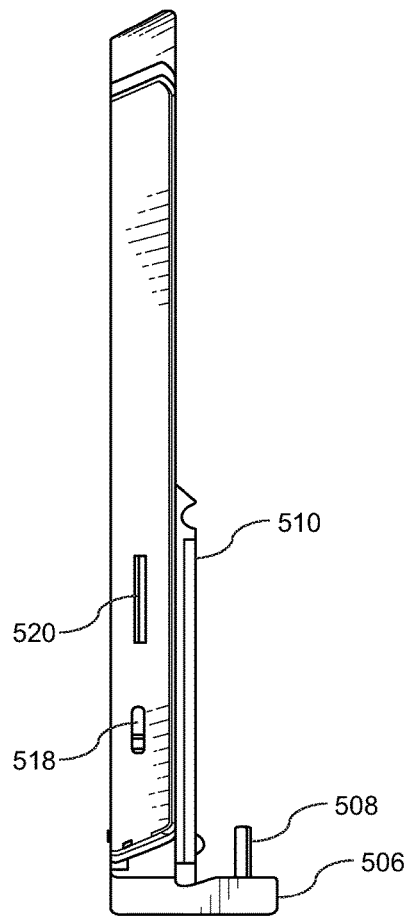
FIG. 5C illustrates a left-side view of an apparatus, in accordance with an embodiment of the present invention.
Figure 5D:
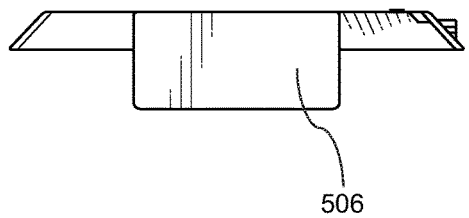
FIG. 5D illustrates a bottom view of an apparatus, in accordance with an embodiment of the present invention.

In one embodiment of the present invention, as shown in FIG. 5A and FIG. 5B, a USB port 512, a memory device holder 514, an output port 516, a power switch 518 and a secondary storage slot 520 for an additional SD card(s) are disposed on the sides of the first portion 504. While FIG. 5A and FIG. 5B represent one configuration, in other embodiments of the present invention, the USB port 512, a memory device holder 514, an output port 516, a power switch 518 and a secondary storage slot 520 may be placed in any configuration and location on the first portion 504. The memory device holder 514 receives a memory storage device (not shown). Example of the memory device holder 514 may include a Secure Digital (SD) card slot, a mini SD card slot, a micro SD card slot, a Multi Media Card (MMC) slot and so forth.

In some embodiments, a battery (not shown) may be disposed within the body 502 of the apparatus 500. In another embodiment of the present invention, when the apparatus 500 is coupled to an Otterbox® Universal Case or an Otterbox® Universal Case housing a mobile electronic device (not shown), the battery charges an internal battery of the mobile electronic device through the connector 508 and the electrical bus. The battery provides power backup to an attached mobile electronic device, in case the internal battery of the mobile electronic device is depleted or on the verge of being depleted. Alternatively, the battery may charge the mobile electronic device in the event the internal battery of the mobile electronic device requires charging. The battery can include any battery type such as, but not limited to, a lithium polymer battery, a lithium ion battery, a nickel metal hybrid battery, a nickel cadmium battery and so forth. In some other embodiments, the battery may act also as a power source for various internal components of the case 500. The apparatus 500 includes a power switch 518 to power the battery, as shown in FIG. 5B. The power switch 518 is linked to the battery through the electrical bus. The charging port 512 connects the battery to an external power supply in the event that the battery is required to be charged. The charging port 512 may be but not limited to a USB port, a micro-USB port or a USB-C port.

An output port 516 is disposed on the first portion 504 of the body 502, as shown in FIG. 5A and FIG. 5B. The output port 516 allows a user to connect an external device (not shown) to the mobile electronic device housed within the Otterbox® Universal Case. The external device may include devices such as, but not limited to, headphones, earphones, speakers, portable media players, a television set and so forth. In some embodiments, the output port 516 establishes a bi-directional signal link between a wired external device (not shown) and the mobile electronic device. The output port 516 may be an audio port, a video port or a combination of both.

Figure 6:
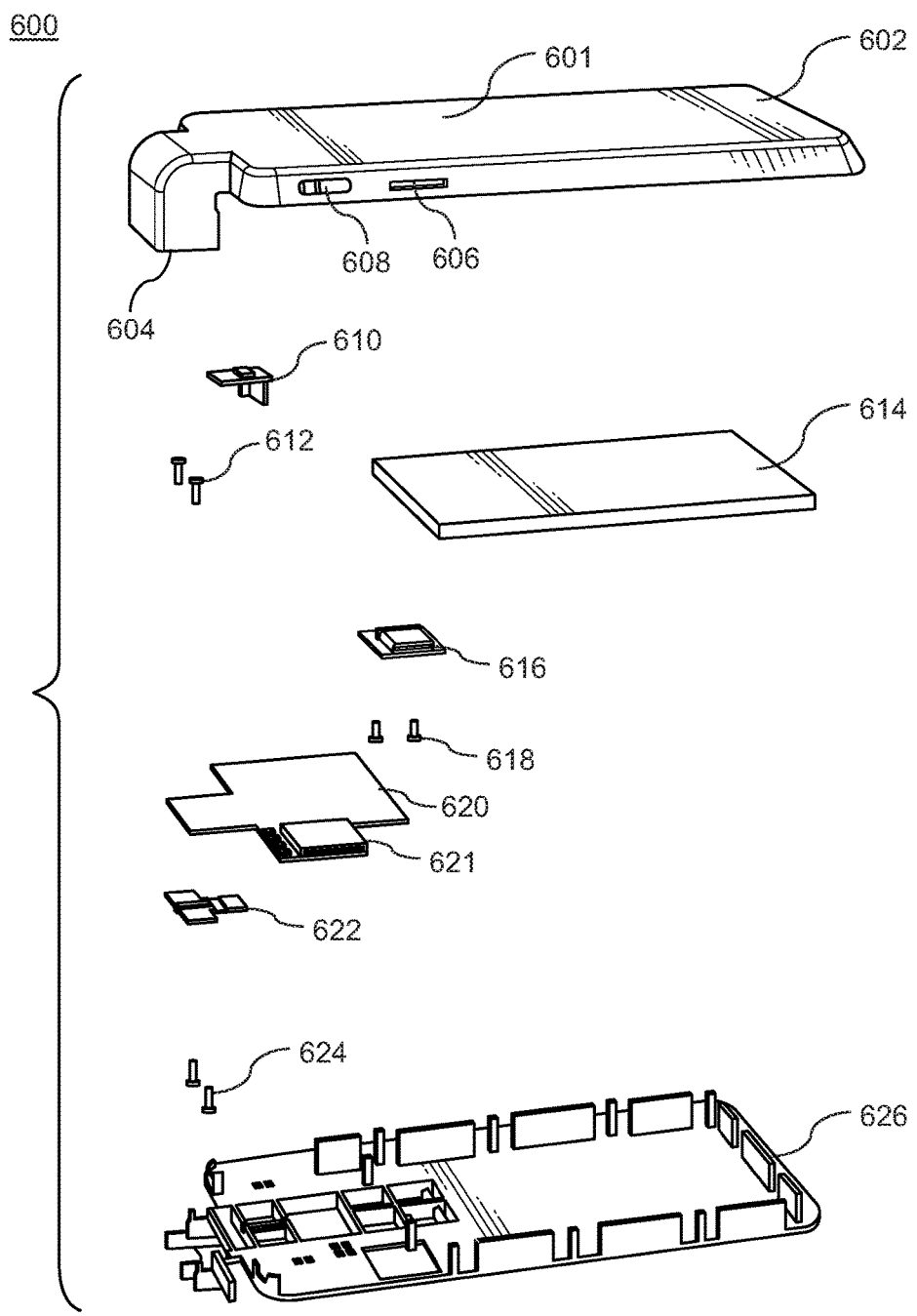
FIG. 6 is an exploded view of an apparatus, in accordance with an embodiment of the present invention.

FIG. 6 is an exploded view of the apparatus 600. The apparatus 600 includes a body 601 with a first portion 602, a second portion 604 extending from the first portion 602, and a secondary storage slot for additional SD card(s) 606 and a power switch 608 along with an USB port (not shown), memory device holder (not shown) and an output port (not shown). A power switch 608 is fixed to the body 601. A USB port 616 is fixed to the body 601. The USB port 616 may be but not limited to a USB port, a micro-USB port or a USB-C port. The apparatus 600 includes a printed circuit board 620 (PCB 620) with a memory device holder 621 attached. In some embodiments, the printed circuit board further includes audio circuitry, coder-decoder programmable chips, a processor, a digital-to-analog converter (DAC) and an analog-to-digital converter (ADC). The processor is the same as the processor 438 illustrated in FIG. 4. Similarly, the DAC is the same as the digital-to-analog converter 440 illustrated in FIG. 4. The PCB 620 is attached to the body 601 such that the memory device holder 621 may detachably receive a memory storage device (not shown). Examples of the memory device holder 621 may include a Secure Digital (SD) card slot, a mini SD card slot, a micro SD card slot, a Multi Media Card (MMC) slot and so forth.

A battery 614 is disposed within the body 601. A connector 622 is attached to the second portion 604 of the body 601. Upon securing the apparatus to an Otterbox® Universal Case housing a mobile electronic device, the connector 622 is communicably coupled to an input port of the mobile electronic device. The body 601 with all the internal components 610, 614, 616, 620 and 622 is sealed by a base 626 using screws 612, 618 and 624. The internal components 610, 614, 616, 620 and 622 are communicably coupled to each other through an electrical bus (not shown). The components 601, 610, 612, 614, 616, 618, 620, 621, 624 and 626, illustrated in FIG. 6 may be included in the case 100 (shown in FIG. 1A) and the case 500 (shown in FIG. 5A).

FIGS. 7A, 7B, 7C and 7D illustrate a right-side view, a left-side view, a bottom view and a top view of the apparatus 700. As shown in FIGS. 7A and 7B, the apparatus 700 includes the connector 722 and a rail 730. As shown in FIG. 7A, the apparatus further includes a USB port 712 a memory device holder 714 and an output port 716. As shown in FIG. 7B, the apparatus further comprises a secondary slot 706 for additional SD card(s) and a power switch 708. The output port 716 allows a user to connect an external device (not shown) to the mobile electronic device (not shown) via the apparatus 600. The external device may include devices such as, but not limited to, headphones, earphones, speakers, monitors, television sets, portable media players and so forth. In some embodiments, the output port 716 establishes a bi-directional signal link between a wired external device (not shown) and the mobile electronic device. In an exemplary embodiment, the output port 716 may be an audio port with an internal diameter of 3.55 millimeter. The internal diameter of such an audio port is exemplary in nature, and the output port 716 may have any suitable dimensions for the transmission of an audio signal between the mobile electronic device and the audio transmitting device.

Figure 7E:
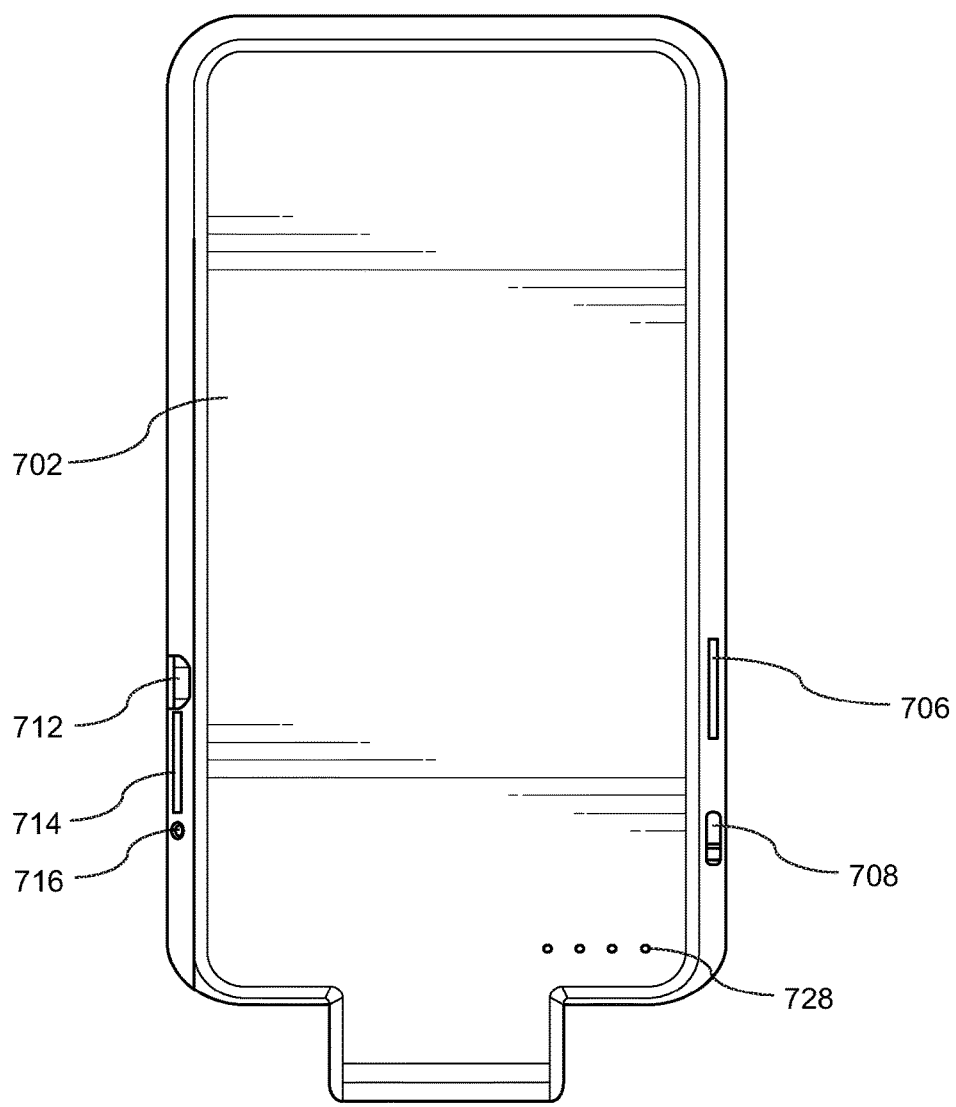
FIG. 7E illustrates a rear view of the apparatus, in accordance with an embodiment of the present invention.

FIG. 7E illustrates a rear view of the apparatus 700 having an indicator 728 indicative of at least an amount of power in the battery and a status of the storage device in the memory device holder 714. In some embodiments, the indicator 728 may include multiple light emitting diodes (LEDs). The number of glowing LEDs indicates the amount of power in the battery. In other embodiments, the number of glowing LEDs may indicate the amount of storage space in the storage device. In yet other embodiments, the indicator 728 includes two sets of LEDs, one set indicative of the amount of power in the battery and the other set indicative of the state of the storage device. The processor on the printed circuit board determines the amount of power in the battery and the amount of free space in the storage device and accordingly controls the indicator 728.

Figure 7F:
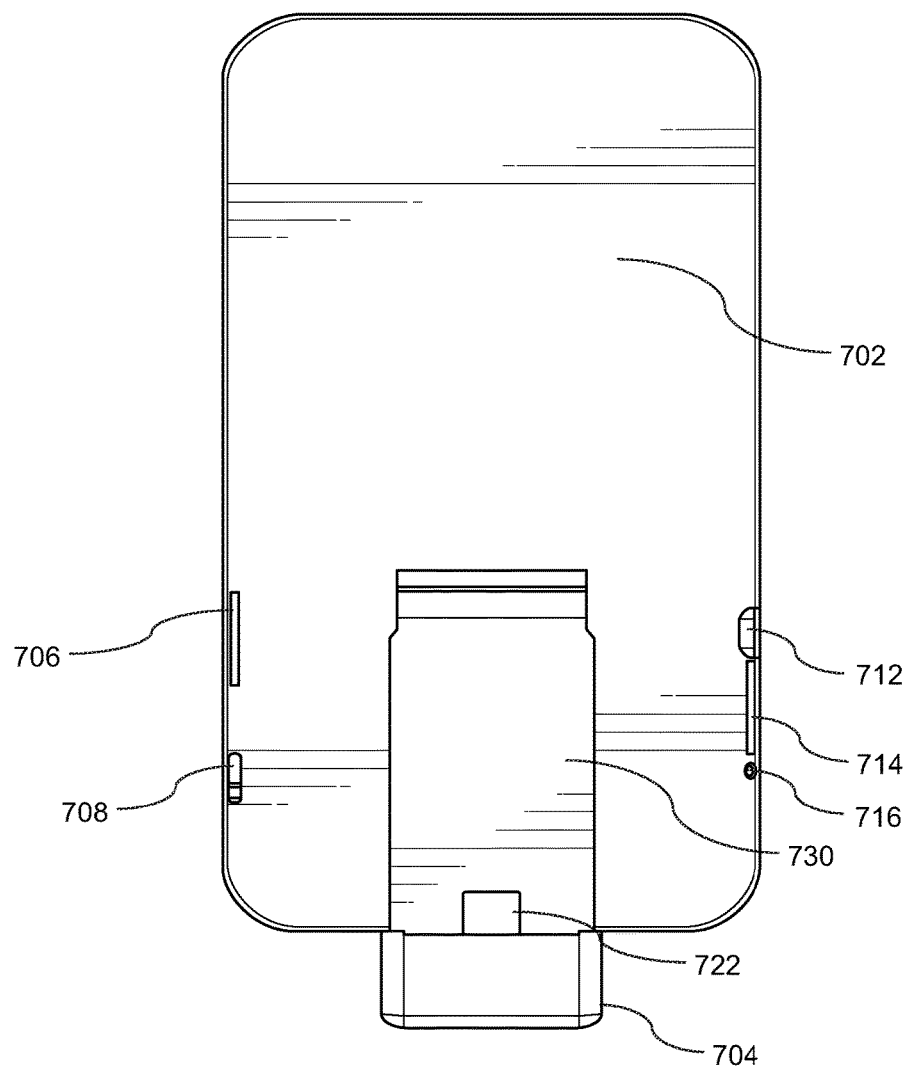
FIG. 7F illustrates a front view of the apparatus, in accordance with an embodiment of the present invention.

FIG. 7F illustrates a front view of the apparatus 700. The first portion 702 includes a rail 730. An Otterbox® Universal Case or an Otterbox® Universal Case housing a mobile electronic device, may be secured to the apparatus 700 using the rail 730.

Figure 8A:
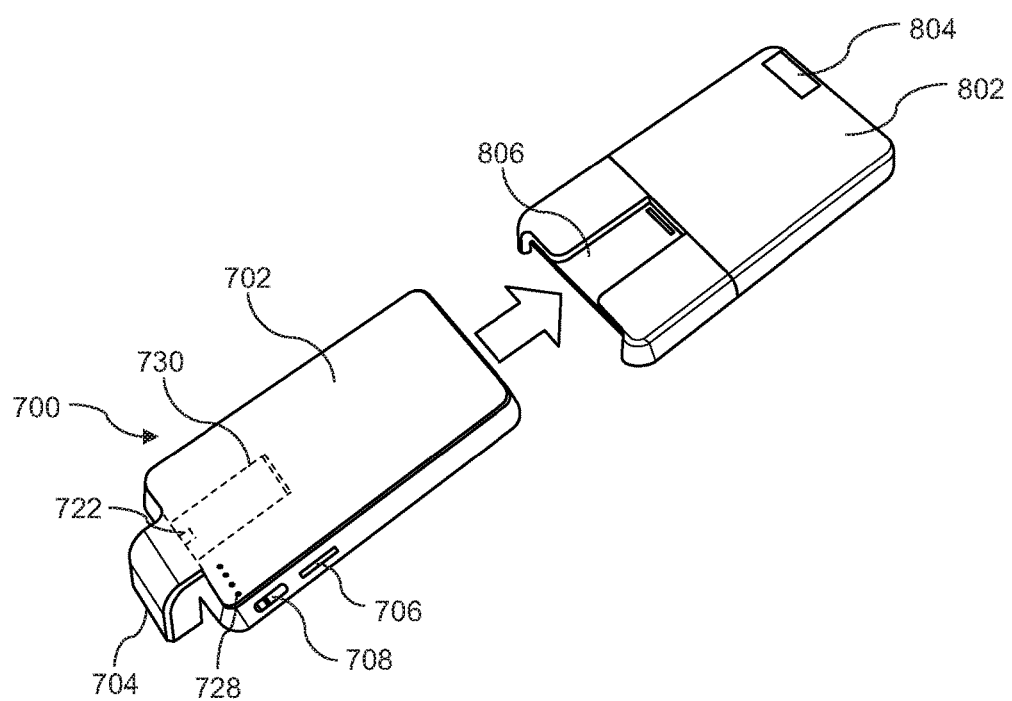
FIG. 8A illustrates the apparatus being secured to an Otterbox® Universal Case, in accordance with an embodiment of the present invention.
Figure 8B:
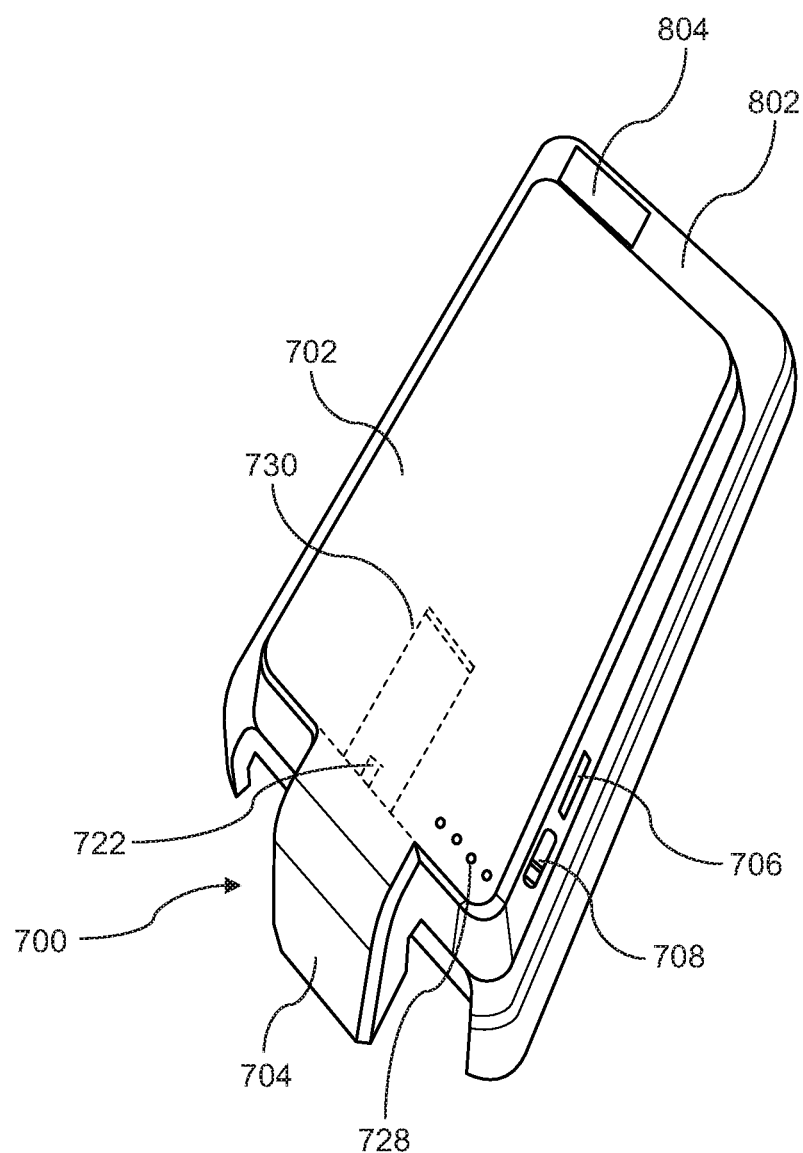
FIG. 8B illustrates the apparatus and an Otterbox® Universal Case secured together, in accordance with an embodiment of the present invention.

FIG. 8A illustrates an Otterbox® Universal Case 802 for a mobile electronic device being secured to the apparatus 700. The Otterbox® Universal Case 802 includes a compartment 806 to which the rail 730 may be secured. In some embodiments, the Otterbox® Universal Case 802 includes an opening 804 that overlaps any camera that may be a part of the mobile electronic device. FIG. 8B illustrates the Otterbox® Universal Case 802 attached to the apparatus 700.

FIGS. 9A, 9B, 9C, 9D, 9E and 9F illustrate various views of an apparatus 900. The apparatus 900 is similar to the case 100 except for some physical design features such as a rail. The shape of the rail of the apparatus 900 may be different from the shapes of the rail 510 (shown in FIG. 5A) and the rail 730 (shown in FIGS. 7A and 7B). The apparatus 900 also includes an additional memory device holder, an indicator and a power switch. The components 601, 610, 612, 614, 616, 618, 620, 621, 624 and 626, as illustrated in FIG. 6, may be included in the apparatus 900.

Figure 9A:
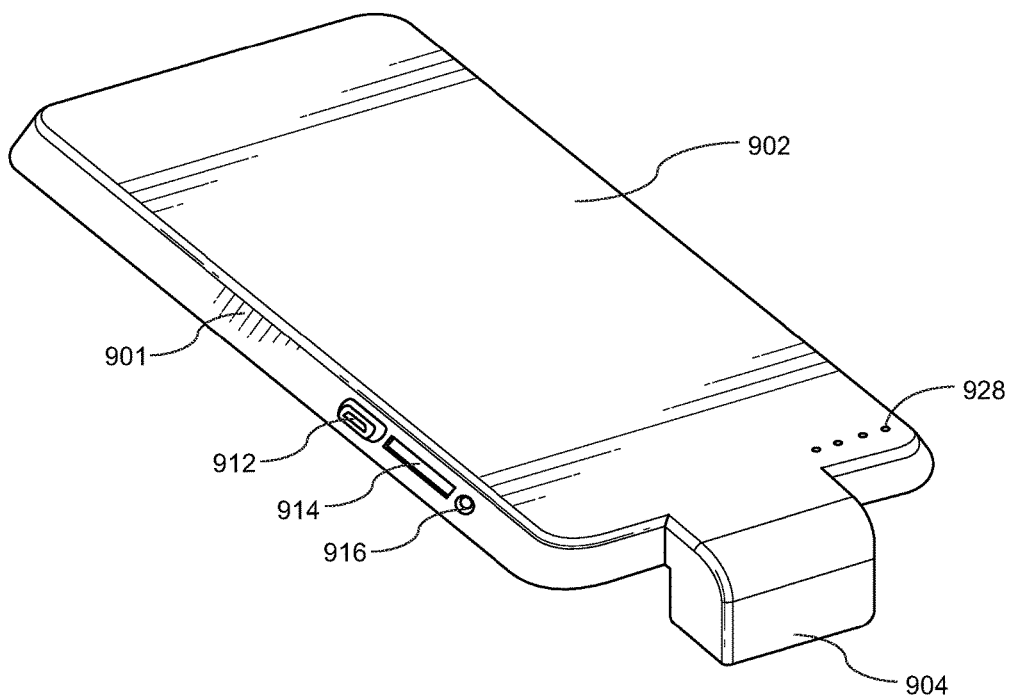
FIG. 9A illustrates a perspective view of an apparatus, in accordance with an embodiment of the present invention.
Figure 9B:
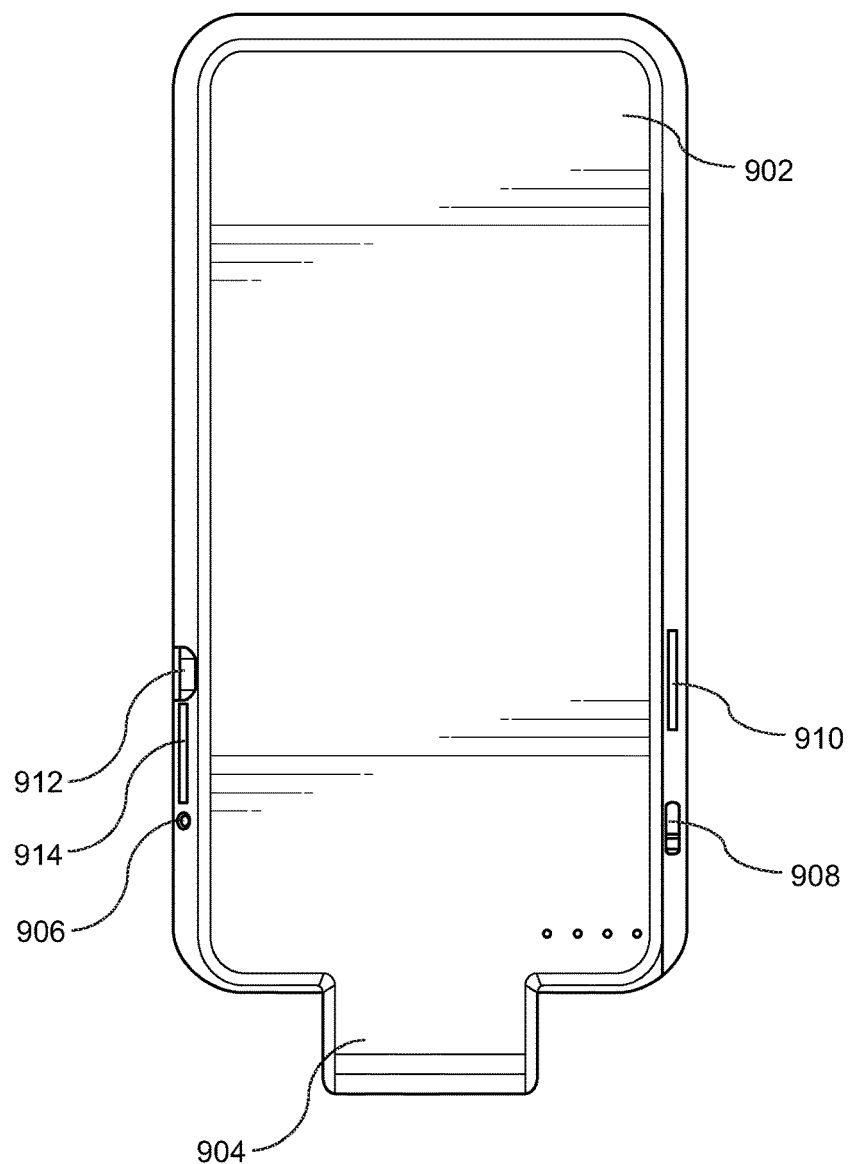
FIG. 9B illustrates a rear view of an apparatus, in accordance with an embodiment of the present invention.

FIG. 9A illustrates a perspective view of the apparatus 900. The apparatus 900 includes a body 901 with a first portion 902 and a second portion 904 extending from the first portion 902. FIG. 9 further illustrates a USB port 912, a memory device holder 914 and an output port 916 disposed on one side of the first portion 902. The memory device holder 914 receives a memory storage device (not shown). Examples of the memory device holder 914 may include a Secure Digital (SD) card slot, a mini SD card slot, a micro SD card slot, a Multi Media Card (MMC) slot and so forth. The apparatus 900 further includes a power switch 908 and a secondary slot 910 for additional SD card(s) as shown in FIG. 9B. As with the afore noted embodiments, the configurations of the USB port 912, memory device holder 914, output port 906, power switch 908 and secondary slot 910 for additional SD card(s) are not limited to the FIGS. referenced herein and may be configured anywhere on the first portion 902.

Figure 9C:
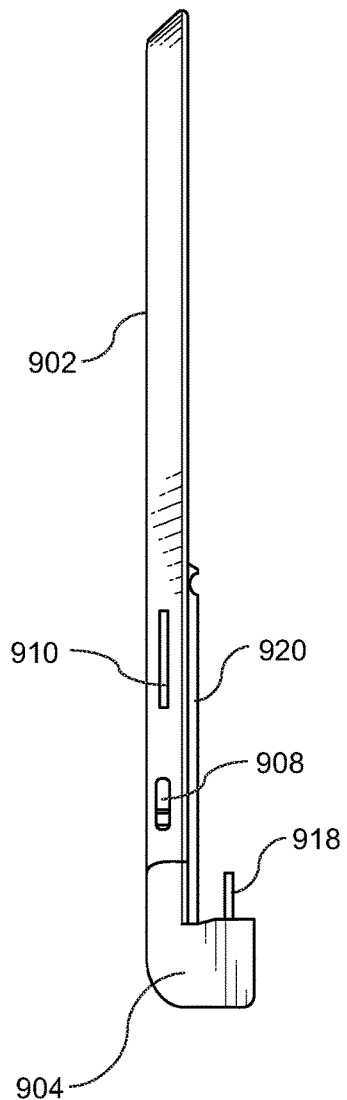
FIG. 9C illustrates a left-side view of an apparatus, in accordance with an embodiment of the present invention.
Figure 9D:
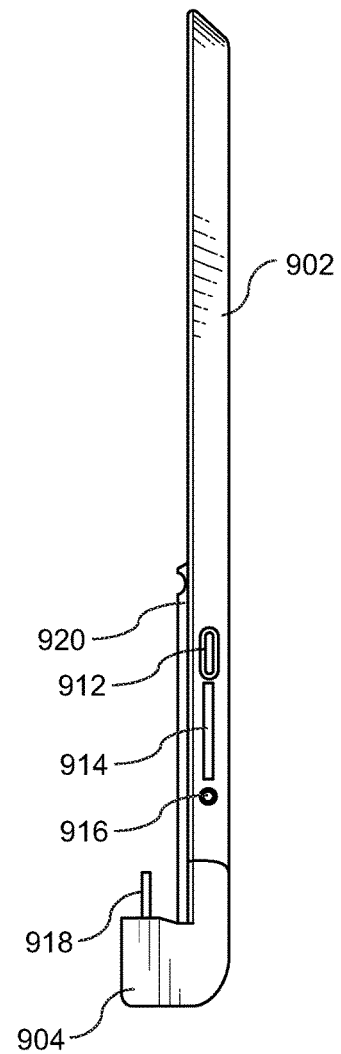
FIG. 9D illustrates a right-side view of an apparatus, in accordance with an embodiment of the present invention.
Figure 9E:
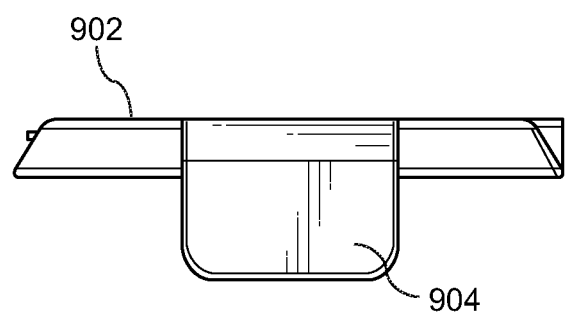
FIG. 9E illustrates a bottom view of an apparatus, in accordance with an embodiment of the present invention.
Figure 9F:
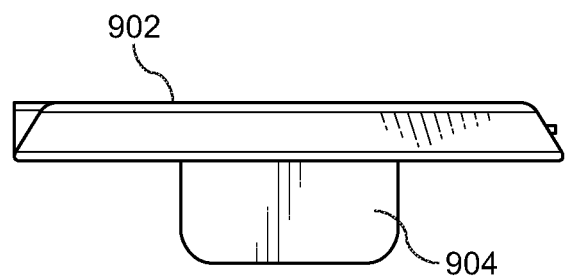
FIG. 9F illustrates a top view of an apparatus, in accordance with an embodiment of the present invention.

FIGS. 9B, 9C, 9D, 9E and 9F illustrate a rear view, a left side view, a right-side view, a bottom view and a top view of the apparatus 900, respectively. As shown in FIGS. 9B, 9C and 9D, the apparatus 900 includes a USB port 912, a memory device holder 914, output port 906, power switch 908 and secondary slot 910 for additional SD card(s). As shown in FIGS. 9C and 9D, the apparatus 900 includes a connector 918. The connector 918 has the same function as the connector 118 shown in FIG. 1A.

Figure 10:
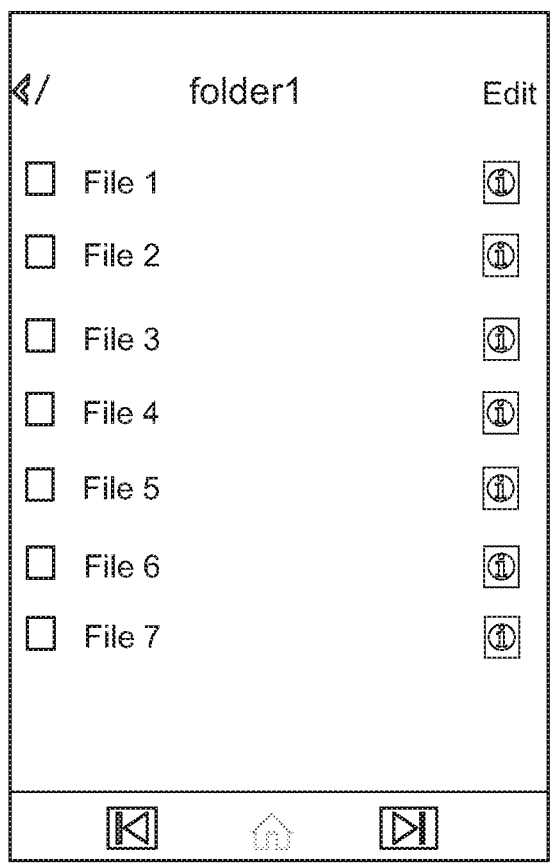
FIG. 10 illustrates a user interface displayed on a mobile electronic device, in accordance with an embodiment of the present invention.

FIG. 10 is an illustration of a user interface 1000 generated by the processor 438. When the mobile electronic device is coupled to the connector 118, the processor 438 generates a user interface that is displayed through an application on the mobile electronic device. The application may be obtained from the Internet or may be installed by the processor 438 on the mobile electronic device 332 upon coupling the mobile electronic device to the connector 118. The user interface 1000 displays indicia indicative of data stored in the memory storage device 226 and/or the flash memory 228. As shown in FIG. 10, the user interface 1000 displays all the files stored on the memory storage device 226. In some embodiments, the user interface 1000 enables a user to transfer any data on the mobile electronic device 332 to the memory storage device 226. The user interface 1000 may also include a media player for the playing of media files stored on the mobile electronic device 332, on the flash memory 228 or the memory storage device 226.

Figure 11:
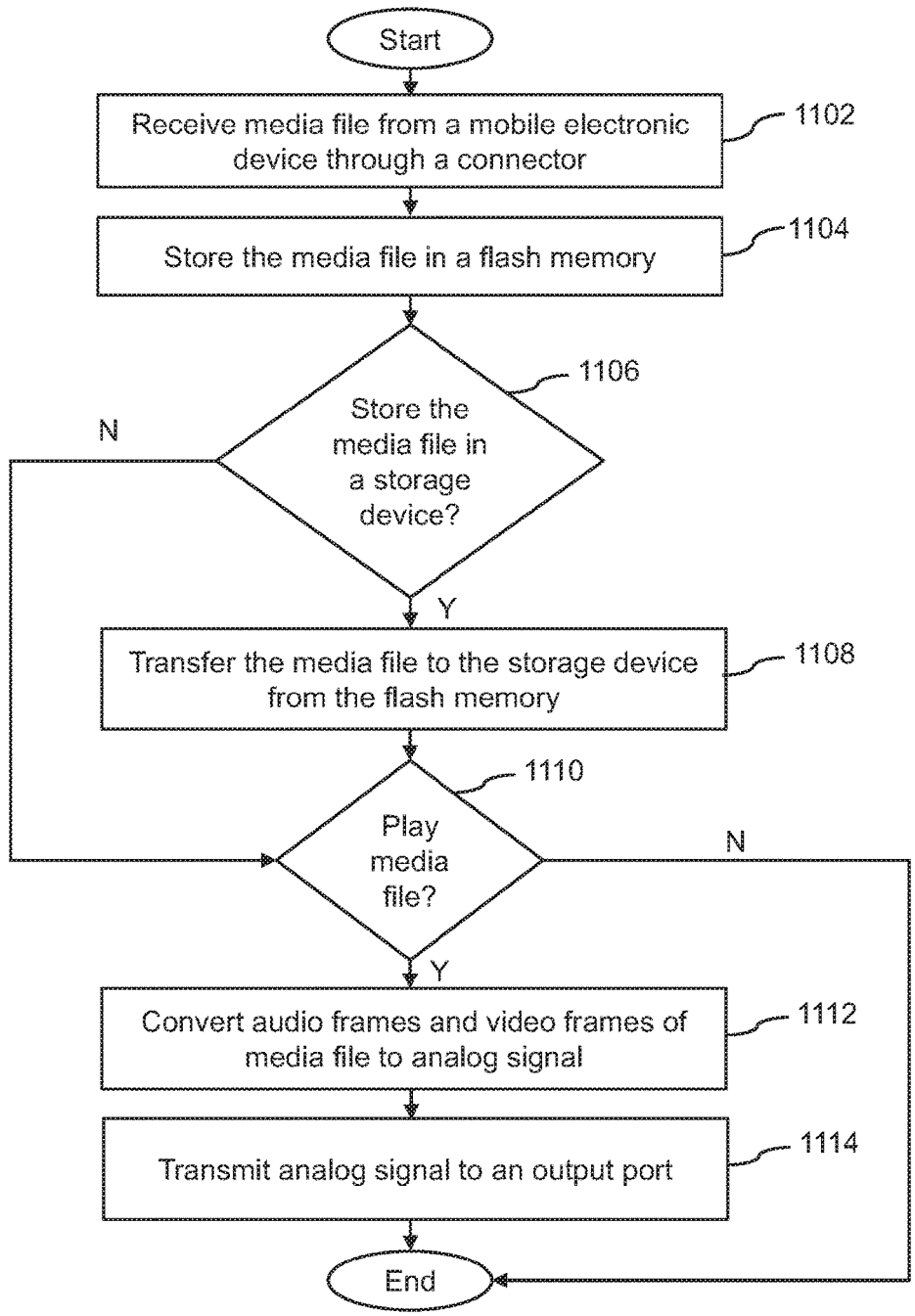
FIG. 11 illustrates a flowchart of an exemplary method of playing files, in accordance with the disclosed subject matter.

FIG. 11 illustrates a method 1100 of storing data from the mobile electronic device 332 to the memory storage device 226, in accordance with the disclosed subject matter. This flowchart is merely provided for exemplary purposes and with reference to FIGS. 1A, 1B, 1C, 2, 3, 4 and 10. However, the flowchart is applicable to the apparatus illustrated in FIGS. 5A, 5B, 5C, 5D, 6, 7A, 7B, 7C, 7D, 7E, 7F, 8A, 8B, 9A, 9B, 9C, 9D, 9E and 9F. Embodiments are intended to include or otherwise cover any methods or procedures for data transmission.

When the mobile electronic device 332 is coupled to the connector 118, the processor 438 generates a user interface that is displayed through an application on the mobile electronic device. The application may be obtained from the Internet or may be installed by the processor 438 on the mobile electronic device 332 upon coupling the mobile electronic device to the connector 118. The user interface 1000 displays indicia indicative of data stored in the memory storage device 226 and/or the flash memory 228. As shown in FIG. 10, the user interface 1000 displays all the files stored on the memory storage device 226. Additionally, the user interface 1000 enables a user to transfer any data on the mobile electronic device 332 to the memory storage device 226.

In some embodiments, the application may provide a media player that accesses media files stored on the mobile electronic device 332. Upon accessing a media file through the application, at steps 1102 and 1104, the processor 438 transfers the media file to the flash memory 228 through the connector 118 and the bus 402. In some embodiments, a media player within the application plays the media file from the flash memory 228. The application further enables a user to direct the processor 438 to transfer the media file to the memory storage device 226 through the bus 402. At step 1106, the user may choose to transfer the media file to the memory storage device 226. At step 1108, the media file is transferred by the processor 438 from the flash memory 228 to the memory storage device 226 through the memory card slot 120 and the bus 402. The media file may then be played from the memory storage device 226. In some embodiments, any other media files previously stored on the memory storage device 226 may also be played directly through the user interface provided by the processor 438.

At step 1110, the user interface 1000 may receive an input indicative of playing the media file. At step 1112, audio and video frames pertaining to the media file are sampled and converted to an analog signal by a digital-to-analog converter 440 (D/A converter 440). At step 1114, the analog signal is transmitted to the output port 122. The signal is further transmitted to the external device 434. In some embodiments, the processor 438 may determine if the external device 434 is connected to the output port 122 and play the media file from the flash memory 228 only if the external device 434 is connected to the output port 122.

Embodiments of the present disclosure may also include various methods for providing a bi-directional link between the mobile electronic device 332 and the external device 434 via the processor 438 and the bus 402.

Embodiments of the present disclosure may also include various methods for charging the internal battery of the mobile electronic device 332 by the battery 230 and/or the external energy source 436.

In other embodiments, the case 100 and the apparatus 500, 600, 700 and 900 may also include an indicator (not shown) to display various information such as charging status, memory status and so forth. Examples of the indicator may include, but not limited to, Light Emitting Diode (LED) indicator, a display and so forth.

In some embodiments, the case 100 and the apparatus, 500, 600, 700 and 900 may include output ports of various sizes and type. The output port may be, but not limited to a 3.5 millimeter audio jack, a video serial port, an audio/visual (AV) port, a VGA (Video Graphics Array), a HDMI (High Definition Multimedia Interface) port, a DVI (Digital Visual Interface) port, a firewire port, a USB (Universal Serial Bus) port and a USB-C (Universal Serial Bus-C) port. Accordingly, the media file to be played may be converted to an analog signal or compressed to a format acceptable by the output port. The processor 438 may include circuitry pertaining various coder-decoder programs to facilitate the compression of the media file.

Embodiments of the present invention are directed to a case for use with a mobile electronic device, as well as an apparatus for use with an Otterbox® Universal Case, as well as, an Otterbox® Universal Case housing a mobile electronic device. The case is detachably attached to the mobile electronic device. In other embodiments of the present invention, the apparatus may be detachably attached to an Otterbox® Universal Case, as well as, an Otterbox® Universal Case housing a mobile electronic device. The case/apparatus is further is communicably coupled to the mobile electronic device through a connector, which acts as a charging interface and a data interface between the case and the mobile electronic device. The case includes a battery and a memory. The case provides extended battery life and additional memory to the mobile electronic device. Media files may be transferred from the mobile electronic device to the memory. The case includes an output port that links the case to an external device, such as headphones or a display monitor. The transferred media files are compressed to a format compatible with the external device or converted to an analog signal that may be transmitted to the external device. The output port enables transmission of media files to a headphone or a display monitor that may be incompatible with the mobile electronic device. The battery usage of the mobile electronic device is reduced since media files are played from the case. The case may also include an additional storage slot for storing additional SD cards.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for use with a universal case housing a mobile electronic device, the apparatus comprising:
   a body comprising a fastener to detachably secure the universal case, the fastener comprising:
   a single rail to detachably secure the apparatus to the universal case, the single rail comprising side edges to slidably engage with the universal case, the single rail further comprising a detent to engage with the universal case;
   an electrical bus disposed within the body;
   a connector communicably coupled to the mobile electronic device;
   a memory to store a file received from the mobile electronic device through the connector;
   a processor to generate a signal based on the file stored in the memory; and
   an output port to transmit the signal generated by the processor to an external device, wherein the external device is communicably coupled to the output port,
   wherein the connector, the memory, the processor and the output port are communicably coupled to the electrical bus.

2. The apparatus of claim 1, further comprising a memory device holder disposed on the body, wherein the memory device holder detachably receives a storage device in order to communicably couple the storage device with the electrical bus.

3. The apparatus of claim 1, wherein the processor:
   generates indicia indicative of data stored in the storage device; and
   generates a user interface for displaying the indicia, wherein the user interface is displayed through an application on the mobile electronic device.

4. The apparatus of claim 1, further comprising a rechargeable battery disposed within the body, the rechargeable battery communicably coupled to the connector through the electrical bus, wherein the rechargeable battery supplies electrical energy to the mobile electronic device through the connector.

5. The apparatus of claim 4, further comprising a charging port disposed on the body, wherein the charging port connects the rechargeable battery to an external power source.

6. The apparatus of claim 1, wherein the processor further:
   determines a state of charge of a battery of the mobile electronic device when the mobile electronic device is communicably coupled to the connector; and controls charging of the battery of the mobile electronic device by the rechargeable battery based on the state of charge.

7. A system for use with a mobile electronic device, the system comprising:
  a universal case housing a mobile electronic device;
  an apparatus detachably secured to the universal case, the apparatus comprising:
    a body comprising a single rail to detachably secure the universal case by use of the rail, the single rail comprising side edges to slidably engage with the universal case, the single rail further comprising a detent to engage with the universal case;
    an electrical bus disposed within the body;
    a connector communicably coupled to the mobile electronic device;
    a memory to store a file received from the mobile electronic device through the connector;
    a processor to generate a signal based on the file stored in the memory; and
    an output port to transmit the signal generated by the processor to an external device, wherein the external device is communicably coupled to the output port, wherein the connector, the memory, the processor and the output port are communicably coupled to the electrical bus.

8. The system of claim 7, wherein the apparatus further comprises a memory device holder disposed on the body, and wherein the memory device holder detachably receives a storage device in order to communicably couple the storage device with the electrical bus.

9. The system of claim 7, wherein the processor:
  generates indicia indicative of data stored in the storage device; and
  generates a user interface for displaying the indicia, wherein the user interface is displayed through an application on the mobile electronic device.

10. The system of claim 7, wherein the apparatus further comprises a rechargeable battery disposed within the body, the rechargeable battery communicably coupled to the connector through the electrical bus, wherein the rechargeable battery supplies electrical energy to the mobile electronic device through the connector.

11. The system of claim 7, wherein the apparatus further comprises a charging port disposed on the body, and wherein the charging port connects the rechargeable battery to an external power source.

* * * * *